(12) United States Patent
Itokawa et al.

(10) Patent No.: US 7,108,146 B2
(45) Date of Patent: Sep. 19, 2006

(54) SYNTHETIC RESIN BOTTLE WITH A HANDLE

(75) Inventors: Junichi Itokawa, Tokyo (JP); Yoshinori Matsuo, Tokyo (JP); Takao Iizuka, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 10/508,516

(22) PCT Filed: Jul. 31, 2003

(86) PCT No.: PCT/JP03/09710

§ 371 (c)(1),
(2), (4) Date: Feb. 7, 2005

(87) PCT Pub. No.: WO2004/011229

PCT Pub. Date: Feb. 5, 2004

(65) Prior Publication Data

US 2005/0115919 A1    Jun. 2, 2005

(30) Foreign Application Priority Data

| Jul. 31, 2002 | (JP) | .............................. 2002-222865 |
| Jul. 31, 2002 | (JP) | .............................. 2002-222866 |
| Aug. 30, 2002 | (JP) | .............................. 2002-255119 |

(51) Int. Cl.
*B65D 23/10* (2006.01)
(52) U.S. Cl. ..................... 215/398; 215/386; 220/771
(58) Field of Classification Search ............... 215/396, 215/398; 220/770, 771
See application file for complete search history.

(56) References Cited

U.S. PATENT DOCUMENTS

| 5,167,970 | A | * | 12/1992 | Yoshino et al. | .............. 425/525 |
| 5,704,506 | A | * | 1/1998 | Tobias et al. | ............... 215/398 |
| 5,819,966 | A | * | 10/1998 | Ota et al. | .................... 215/398 |
| D404,308 | S | * | 1/1999 | Takahashi et al. | ........... D9/531 |
| 5,931,324 | A | * | 8/1999 | Lyons et al. | ................. 215/398 |
| 6,012,597 | A | * | 1/2000 | Nishihara et al. | ........... 215/398 |
| 6,460,715 | B1 | * | 10/2002 | Yonemori et al. | .......... 215/396 |

FOREIGN PATENT DOCUMENTS

| EP | 650900 A1 | 5/1995 |
| JP | A 6-298253 | 10/1994 |
| JP | 07080921 A | * 3/1995 |

(Continued)

*Primary Examiner*—Sue A. Weaver
(74) *Attorney, Agent, or Firm*—Oliff & Berridge, PLC

(57) ABSTRACT

A synthetic resin bottle with a handle of this invention comprises a biaxially drawn and blow-molded PET bottle and a handle, an injection-molded product of the same PET resin, which is fitted firmly to the bottle as an insert. The up-and-down property of the surfaces of the handle inserts, which come in contact with the PET bottle, is adjusted in response to the softening and drawing state of the PET preform that is deformed and molded into the bottle. This adjustment causes the friction resistance to be reduced between the handle inserts and the blow-molded PET bottle. The finely textured up-and-down pattern can be easily formed through the tests and adjustments by the surface treatment inside the mold cavity used for the injection molding of the handle. Thus, the optimum surface properties can be obtained in response to the bottle sizes and the handle shapes. Therefore, this invention requires no separate process, such as thermal crystallization. Bottles, which fully get around the handle inserts, have high fitting strength but no abrasion, can be provided at a low cost.

17 Claims, 27 Drawing Sheets

FOREIGN PATENT DOCUMENTS

| | | | |
|---|---|---|---|
| JP | A 7-80921 | 3/1995 |
| JP | 07156952 A * | 6/1995 |
| JP | 07276478 A * | 10/1995 |
| JP | A 11-34155 | 2/1999 |
| JP | B2 2998820 | 1/2000 |
| JP | A 2000-335584 | 12/2000 |
| JP | A 2001-328636 | 11/2001 |

* cited by examiner (a)  C—C (b)  D—D

50μ

(a) After the Smoothing Treatment

50μ

(b) Before the Smoothing Treatment

SYNTHETIC RESIN BOTTLE WITH A HANDLE

TECHNICAL FIELD

This invention relates to a large-size synthetic resin bottle with a handle, in which the handle is fitted firmly to the bottle by using the handle as an insert and by biaxially drawing and blow-molding the bottle of a polyethylene terephthalate resin (hereinafter referred to as PET resin).

BACKGROUND ART

As a large-size bottle, which is easy to handle, there is known a synthetic resin bottle with a handle, in which the handle has been previously injection-molded into a certain shape and is used as an insert, and in which the PET bottle is biaxially drawn and blow-molded. However, it is desired that the handle is made of the same PET as used in the bottle, rather than a polyethylene resin or a polypropylene resin, so that the bottles can be separated and disposed easily at the time of waste disposal.

As conventional art that can meet this demand, Japanese Patent Application (OPI) No. 1994-298253 discloses that the fitting portions of the handle coming in contact with the bottle are crystallized to a degree of crystallinity of 10% or more. This makes it possible for the handle to be made of PET just as the bottle is made of PET. When the PET handle is fitted, usually the bottle tends to be ruptured because slide gets worse, but the crystallization prevents the bottle from rupturing during the drawing and deformation.

However, in the above-described conventional art, a dedicated operation is required for the crystallization treatment (typically, thermo-crystallization treatment) of the fitting portion, which is a specified portion of the handle. A problem arose here that it takes more time and labor to mold a bottle.

When the fitting portions of the handle are heated for crystallization, it is necessary to control the heat precisely, without giving any adverse effect thermally on the nearby portions. In practice, therefore, this requires high technological expertise, thus causing a problem that the operation cannot be conducted easily.

A technical problem of this invention is to improve the low slide between bottle and handle made of the same PET. An object of this invention is to obtain a biaxially drawn, blow-molded PET bottle, in which the PET handle is firmly fitted to the bottle as the insert, merely by an ordinary biaxial drawing and blow molding process, without requiring any dedicated operation.

As the handles to be used with this type of synthetic resin bottles with a handle, there are another disclosed in Japanese patent No. 2998820 and Japanese Patent Application (OPI) No. 2001-328636, which is an improvement from the above patent. A lot of these handles are in common use because stable and firm fitting can be secured and because handling of the inserts is easy.

The handle disclosed in the Japanese Patent Application (OPI) No. 2001-328636 is as shown in FIG. 16 and FIGS. 24–27. The handle comprises a grip plate 11' in a vertical strip shape, embedded projecting pieces 14' disposed on the front end faces at the extended end of this grip plate 11', a pair of engaging ridges 15' in a vertical ridge shape disposed on the sides facing each other, a pair of embedded fitting portions K' that serve as strong undercut fittings to the bottle 1', a pair of fitting beams 12' in a vertical rod shape, and a pair of connecting arms 12a' in the curved rod shape, which connect between the pair of fitting beams 12' at both the upper and lower ends of the grip plate 11'.

In the case of this handle 10' shown in these drawings, a vertical projecting wall 5' is held tight by the pair of fitting beams 12' when the wall 5' is formed at the bottom 4' of the recession 3' of the bottle 1'. Therefore, the handle 10' is stably and firmly fitted to the bottle 1'.

The afore-mentioned bottle with a handle can be obtained when injection-molded PET perform P' is blow-molded into the bottle 1'. At that time, the previously injection-molded PET handle 10' is fitted to the bottom of the handle-fitting recession 3' at the rear of the body 2' of the bottle 1' by means of simultaneous insert molding.

During the process of afore-mentioned insert molding, the heated and softened PET preform P' is smoothly deformed as its shape follows the shapes of the embedded projecting pieces 14' and the engaging ridges 15', which are the inserts of the handle 10' and are fitted firmly to the bottle 1'. High fitting strength between the handle 10' and the bottle 1' is obtained by allowing the PET bottle wall portion to get around smoothly and tightly the peripheries of the handle inserts.

However, in the field of alcoholic beverages, juices and other soft drinks, there has lately been an increasing need for larger containers. Even if the bottles have a larger capacity, the neck does not have a large diameter, but has the same diameter as that of small-size bottles in many cases. As a result, it is required that thick-wall preform is drawn at a high magnification and that the biaxial drawing and blow molding operation has to be conducted at a high air-blow pressure.

Therefore, when the PET preform is drawn, a strong force pushes a portion of the expanding bottle wall against the surfaces of the inserts of the handle 10', i.e., the surfaces of the connecting arms 12a', the fitting beams 12', and the embedded projecting portions. At that time, the PET bottle gets abrasions on the clear bottle wall, especially at places near the connecting arms 12a'. The problem of resultant bad appearance of the bottle has to be solved.

Another technical problem of this invention is to prevent abrasions from occurring at the inserts during the biaxial drawing and blow molding operation under a high blowing pressure. Another object of this invention is to provide a synthetic resin bottle with a handle, which has high safety, easy handling ability, and good appearance even in the case of large-size bottles reaching a capacity of a few liters.

DISCLOSURE OF THE INVENTION

The means of carrying out the invention to solve the above technical problems exists in the configuration that the synthetic resin bottle with a handle comprises a body of the biaxially drawn and blow-molded bottle made of a PET resin and a handle, an injection-molded product of a PET resin, which is fitted firmly to the bottle as an insert, wherein an up-and-down pattern has been formed on the surfaces of handle inserts that come in contact with the bottle so that the PET preform in the softened state would have high slidability during the period when the preform is being biaxially drawn and blow-molded into a bottle.

In the first place, it is necessary to determine the shapes of insert portions of the handle adequately in order for the fitting strength to be increased by eliminating such loose fitting of the inserted handle to the bottle that allows the handle to move clatteringly back and forth, from side to side, and up and down.

However, if the PET bottle and the PET handle are used together, the slide between bottle and handle gets worse during the blow molding operation. This is because large contact friction resistance takes place between the expanding bottle and the surfaces of handle inserts that come in contact with the bottle.

Consequently, it becomes insufficient for the bottle to get around the PET handle inserts during the blow molding. There may be a case where fitting strength fails to reach the initially expected level, or there arises a problem of abrasions on the bottle wall.

The inventors of this application concentrated their thoughts on the factors that affect the above-described friction resistance badly, and found out that the cause of aggravated friction resistance is concerned with the viscoelasticity of the PET preform, which is molded into the bottle, and that the friction resistance greatly changes especially with the drawing state. To be more precise, the invention has thus been made from a discovery that the friction resistance can be reduced by changing the up-and-down property of the handle surfaces in response to the drawing state of the PET resin.

The up-and-down property giving high slidability to the surfaces of the handle inserts is adjusted by the tests conducted justifiably for the details of the surfaces and also in response to the shapes and sizes of the bottles. Divided broadly, it is preferred that the portions in contact with the PET preform in the initial stage of drawing have a finely textured up-and-down pattern. On the contrary, in the more advanced drawing stage, it is effective that the surfaces have no up-and-down pattern, but have so-called mirror-finish.

In the initial drawing stage, a relatively large up-and-down pattern, such as narrow grooves, is effective because these grooves reduce the area of contact and lower the friction resistance.

All of the above-described narrow grooves, the finely textured up-and-down pattern, and the mirror-finished surfaces can be easily formed through the tests and adjustments by the surface treatment inside the mold cavity used for the injection molding of the handle. Thus, the optimum surface properties can be obtained in response to the bottle sizes and the handle shapes.

Therefore, this invention requires no separate process, such as the thermal crystallization. Bottles, which fully get around the handle inserts, have high fitting strength and no abrasion, can be provided at a low cost.

The means of carrying out the invention may exist in the configuration that a finely textured up-and-down pattern is closely formed in advance on the surfaces of handle inserts that come in contact with the bottle during the process of biaxial drawing and blow molding.

Because the bottle and the handle are made of PET, the slide gets worse due to the affinity between bottle and handle. In other words, contact friction resistance is generated between the expanding bottle and the surfaces of the handle inserts that come in contact with the bottle.

However, a finely textured up-and-down pattern is closely formed on the surfaces of the handle inserts that come in contact with the bottle during the process of drawing and deformation. The uppermost portions of the ups are easily softened by the heat coming from the bottle, making the insert surfaces much slippery. Due to the affinity between bottle and the surfaces of handle inserts, there occurs routinely an increased level of friction resistance caused by the contact between these two portions. This friction resistance can be readily and securely reduced by the up-and-down pattern on the surfaces.

Therefore, it has become possible to draw biaxially and blow-mold the PET bottle using the PET handle as the insert, under the condition that the expanding bottle is prevented securely from rupture caused by the contact friction resistance between the bottle and the surfaces of handle inserts.

The reduced contact friction resistance found between the expanding bottle and the surfaces of the handle inserts is derived from the surface structure of handle inserts. The bottle can be safely molded, and the handle can be firmly fitted to the bottle, simply by using an injection-molded handle as the insert, with insert surfaces having a specified structure, and by molding the bottle in an ordinary biaxial drawing and blow molding process.

In the invention the handle can comprise consists of a pair of fitting beams disposed in parallel to each other in the standing position; a grip plate integrally disposed to connect between the pair of the fitting beams at both the upper and lower ends; embedded projecting pieces disposed on the outer end face of each fitting beam; and a pair of engaging ridges disposed face-to-face to each other on the opposed surfaces of the fitting beams, and that the fitting beams, the embedded projecting pieces, and the engaging ridges constitute the handle inserts.

In the invention, the embedded projecting pieces, a part of the handle inserts, are stuck out against the wall of the bottle during the process of drawing and deformation. And a tensile force acts between the wall portions contacting the embedded projecting pieces and the other wall portions that are being drawn and deformed. But because of the highly slidable property of the up-and-down pattern on the surfaces of the embedded projecting pieces, this tensile force does not concentrate locally, but acts almost uniformly on the entire wall portions that come in contact with the embedded projecting pieces. In fact, the force used for drawing is not so much concentrated locally as to exert a destructive force on the bottle, and thus the bottle is safely drawn and molded.

As a part of the handle inserts, the engaging ridges are in a position to act as the weirs standing in the way of the moving bottle wall that is drawn in the direction of expansion. However, the finely textured up-and-down pattern is closely formed on the surfaces of the engaging ridges that come in contact with the bottle wall when the wall is drawn and moving. Due to the highly slidable property of the up-and-down pattern, there is an improvement in the slide on the surfaces of the engaging ridges. Thus, the up-and-down pattern reduces the contact friction resistance arising between the expanding bottle wall and the engaging ridges, and the drawn and moving wall of the bottle climbs over and gets around the engaging ridges smoothly.

The invention also comprises that many lateral, narrow grooves are disposed on the front sides of the engaging ridges.

In the invention, many lateral, narrow grooves are disposed on the front sides of the engaging ridges, where an expanding and moving bottle wall portion is pushed toward the engaging ridges. In addition to the finely textured up-and-down pattern that makes the surfaces more slippery, many lateral, narrow grooves, too, serve to reduce the area of contact between the engaging ridges and the bottle, and lower the contact friction resistance arising between these portions. Therefore, the expanding and moving bottle wall portion smoothly climbs over and gets around the engaging ridges.

The invention may exist in the configuration that the handle comprises a pair of fitting beams disposed in parallel to each other in the standing position, a grip plate integrally disposed to connect between the pair of the fitting beams at both the upper and lower ends, embedded projecting pieces disposed on the outer end face of each fitting beam, a pair of engaging ridges, disposed face-to-face to each other on the opposed surfaces of the fitting beams, and many lateral, narrow grooves disposed on the front sides of the engaging ridges, which are a part of the handle inserts that come in contact with the bottle during the process of biaxial drawing and blow molding.

Because the bottle and the handle are made of PET, the slide gets worse due to the affinity between bottle and handle. In other words, contact friction resistance is generated between the expanding bottle and the surfaces of the handle inserts that come in contact with the bottle.

Especially, as a part of the handle inserts, the engaging ridges are in a position to act as the weirs standing in the way of the moving bottle wall that is drawn in the direction of expansion. Actually, however, many lateral, narrow grooves are disposed on the front sides of the engaging ridges that come in contact with the bottle wall when the wall is drawn and moving. These narrow grooves substantially reduce the area of contact between the expanding bottle wall and the front sides of the engaging ridges, and lower the contact friction resistance between these two portions. Thus, the drawn and moving wall of the bottle climbs over and gets around the engaging ridges smoothly.

Therefore, it has become possible to draw biaxially and blow-mold the PET bottle using the PET handle as the insert, under the condition that the expanding bottle is prevented securely from rupture caused by the contact friction resistance between the bottle and the surfaces of handle inserts.

The reduced contact friction resistance found between the expanding bottle and the surfaces of the handle inserts is derived from the handle structure. The bottle can be safely molded, and the handle can be firmly fitted to the bottle, simply by using the injection-molded handle as the insert and molding the bottle in an ordinary biaxial drawing and blow molding process.

The invention also comprises that the embedded projecting pieces can have smooth rounded surfaces.

In the invention, the embedded projecting pieces, a part of the handle inserts, are stuck out against the wall of the bottle during the process of drawing and deformation. And a tensile force acts between the wall portions contacting the embedded projecting pieces and the other wall portions that are being drawn and deformed. But because of the smooth rounded surfaces of the embedded projecting pieces, this tensile force does not concentrate locally, but acts almost uniformly on the entire wall portions that come in contact with the embedded projecting pieces. In fact, the force used for drawing is not so much concentrated locally as to exert a destructive force on the bottle, and thus the bottle is safely drawn and molded.

The invention comprises that forefront grooves of a vertical slit type are notched in the stick-out end faces of the embedded projecting pieces.

In the invention, each stick-out end face of an embedded projecting piece has quite a small area of contact in the width direction. Because of the forefront grooves, the bottle wall can be easily displaced in the lateral direction when the wall slides over the stick-out end faces of the embedded projecting pieces. Consequently, the bottle wall portion located between the two rows of embedded projecting pieces can be further subjected to some degrees of drawing and deformation in the initial period of a biaxial drawing and blow molding operation.

The means of carrying out the invention may exist in the configuration that the bottle has a recession that has been caved in at the rear of body and also comprises a vertical projecting wall disposed in the central part of the bottom of this recession, wherein the handle comprises a pair of fitting beams disposed in parallel to each other in the standing position, connecting arms that are bent and connected to the upper and lower ends of the fitting beams, a grip plate integrally disposed to connect between the pair of fitting beams through the intermediary of the connecting arms, embedded projecting portions, which are disposed on the pair of fitting beams and are used as firm undercut fittings to be fitted to the recession bottom of the bottle, and wherein the connecting arms, a part of the fitting beams, and embedded projecting portions constitute the handle inserts that are fitted to the recession bottom on both sides of the vertical projecting wall of the bottle under the condition that the connecting arms have portions covered with smooth surfaces that come in contact with the botfie.

The connecting arms are disposed behind the main portions of the handle inserts, including the front end faces of the embedded projecting portions or the outer end faces of the fitting beams, and are bent backward and connected to the grip plate. Because of such a shape, the closer to the connecting portions of the grip plate, the more distant positions, away from the outer wall surface of the preform, is taken by the outer end faces of the connecting arms under the condition that the handle has been set inside a split mold. The preform comes in contact with outer surfaces of the connecting arms in a much later time at a relatively advanced stage of drawing (expanding) deformation, i.e., under the condition that hardening due to drawing or what is called the "strain hardening" has been in progress.

At the initial stage of drawing, the preform comes in contact with the front end faces of the embedded projecting portions, gets around corners thereof, and thus has relatively small opportunities in which the PET surface suffers abrasions. However, after the connecting arms have come in contact with the preform, the PET wall portion does not get around these arms, but is pressed against the front end faces of these arms by a large force caused by air blow. Since at that time, the PET wall portion is drawn and expands while sliding along the front end faces in a rasping way, abrasions are expected to occur.

The configuration has been devised, while giving consideration to the state in which the PET preform is drawn and hardened at the stage of contact with the connecting arms, and also to the mechanism of abrasions. These abrasions can be prevented from occurring, by smoothing beforehand the surfaces of the connecting arms that come in contact with the expanding preform. Thus, the slidability of the expanding preform is improved when it slides over the smooth surfaces of the connecting arms.

The PET preform, when used in the softened state as is the case in this invention, undergoes a large change in viscoelasticity, depending on the temperature and the drawing record. Yet it is presumed that the improved slidability caused by the smoothed contact areas becomes effective after the PET drawing has been in much progress and the PET is right in the process of large strain hardening.

The means of carrying out the invention of may exist in the configuration that the connecting arms specified above have smooth surfaces only in the specific areas.

Smooth surfaces of the connecting arms are achieved by smoothing (mirror-finishing) those corresponding surface portions of the injection molding mold. The development of abrasions is delicately affected by such factors as the angle of contact between the expanding preform and the surfaces of the connecting arms, which are disposed at a total of 4 places, i.e., upper and lower ends of the right and left sides of the grip plate. In a case, abrasions occur only on the upper connecting arms. Therefore, it is not always necessary to smooth all the surfaces of the four connecting arms, which come in contact with the bottle. The occurrence of abrasions can be controlled by smoothing partially those specific portions that are selected suitably while checking over the places of abrasions.

The means of carrying out the invention may exist in the configuration that the embedded projecting portions specified above comprises embedded ridges which are located near the corner set by the outer end face and the opposed side of each fitting beam, with the cross-section of each embedded ridge having a generally triangular shape formed by one side of the right angle going down from the opposed side in the roughly vertical direction and the other side of the right angle extending perpendicularly from the outer end face.

The configuration of the embedded ridges has been devised with the goal of accomplishing deformation of the preform along the peripheries of the embedded projecting portions at the initial stage of preform drawing. This goal can be accomplished by disposing the front end faces of the embedded projecting portions at the positions close to the outer wall of the preform when the handle is set inside the blow split mold, and by giving a simple shape to the entire embedded projecting portions. In this configuration, it is possible for the wall portion of the PET bottle to get around the embedded projecting portions to reach the undercut portions. It is also possible to obtain high fitting strength that can fully meet the requirement of large-size bottles.

The means of carrying out the invention may exist in the configuration that each embedded projecting portion comprises embedded projecting pieces disposed on the outer end face of each fitting beam, and also comprises an engaging ridge projecting from the opposed surface of each fitting beam.

The configuration of the embedded projecting portions allows the bottles of larger sizes to be molded without abrasions and with no need of changing the shape of conventional embedded projecting portions.

The means of carrying out the invention may exist in the configuration that in the invention, a finely textured up-and-down pattern is closely formed in advance on the surfaces of handle inserts that come in contact with the bottle during the process of biaxial drawing and blow molding, except for the surfaces of the connecting arms.

In the configuration, the handle inserts, mainly comprising the embedded projecting portions but excluding the connecting arms, are the portions with which the blow-molded PET bottle comes in contact during the initial stage of drawing. A finely textured up-and-down pattern is closely formed in these insert portions to reduce the friction resistance. Since the PET bottle wall portion is allowed to get around the embedded projecting portions tightly, it is fully possible for the fitting strength to be increased to a satisfactory level.

PREFERRED EMBODIMENTS OF THE INVENTION

Figure 1:
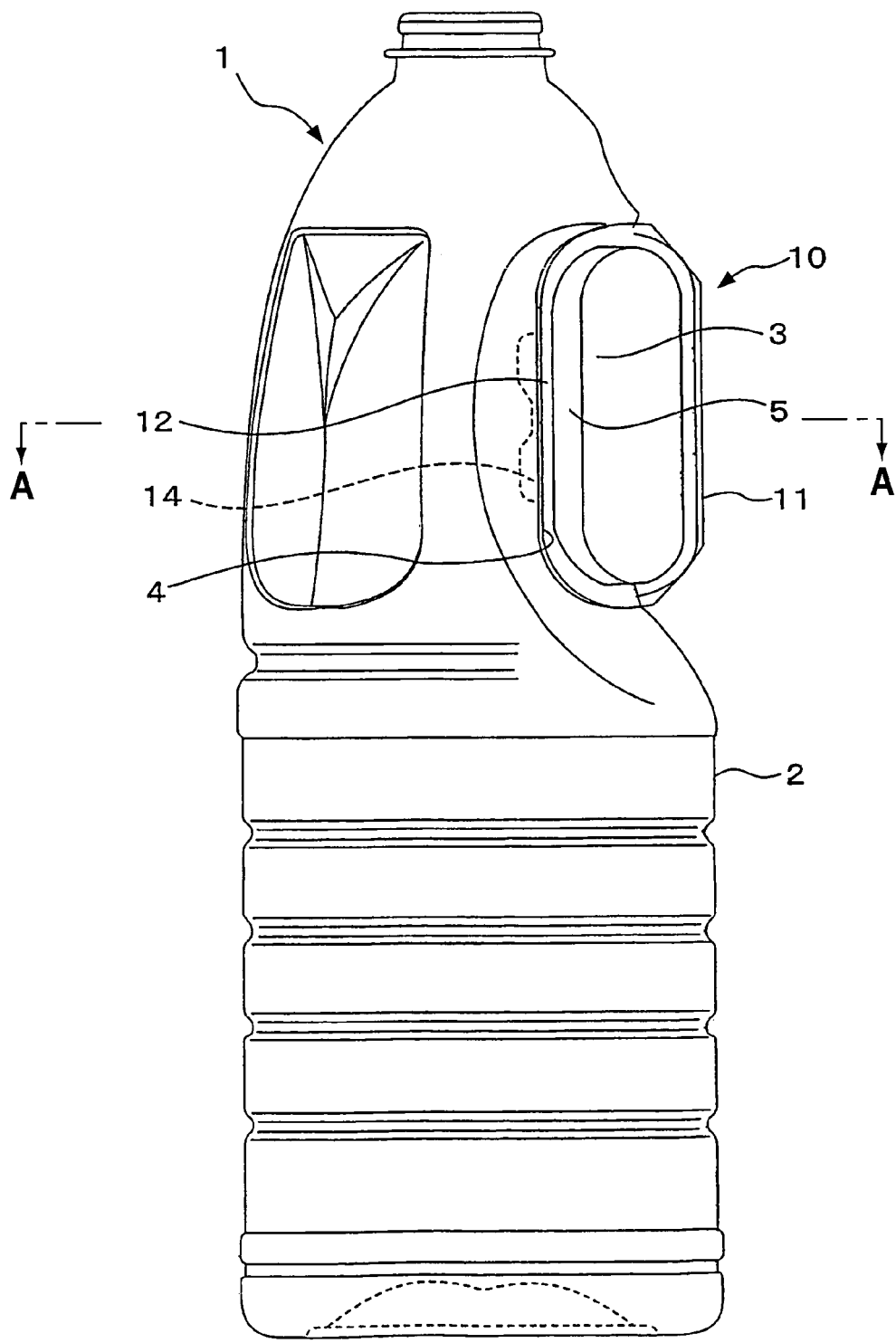
FIG. 1 is an entire side view of the entire synthetic resin bottle with a handle in the first embodiment of this invention.
Figure 2:
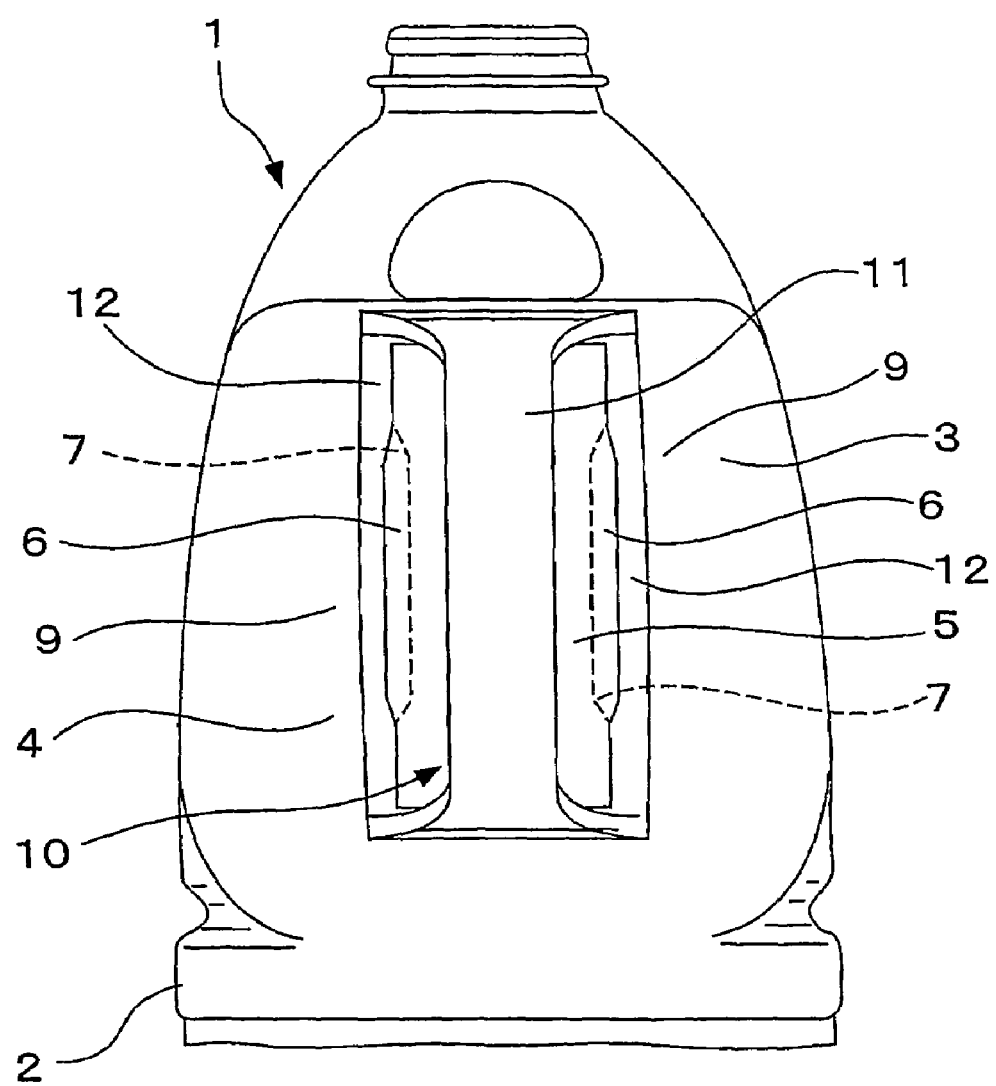
FIG. 2 is a rear view of the important portion of the handle used in the first embodiment shown in FIG. 1.
Figure 3:
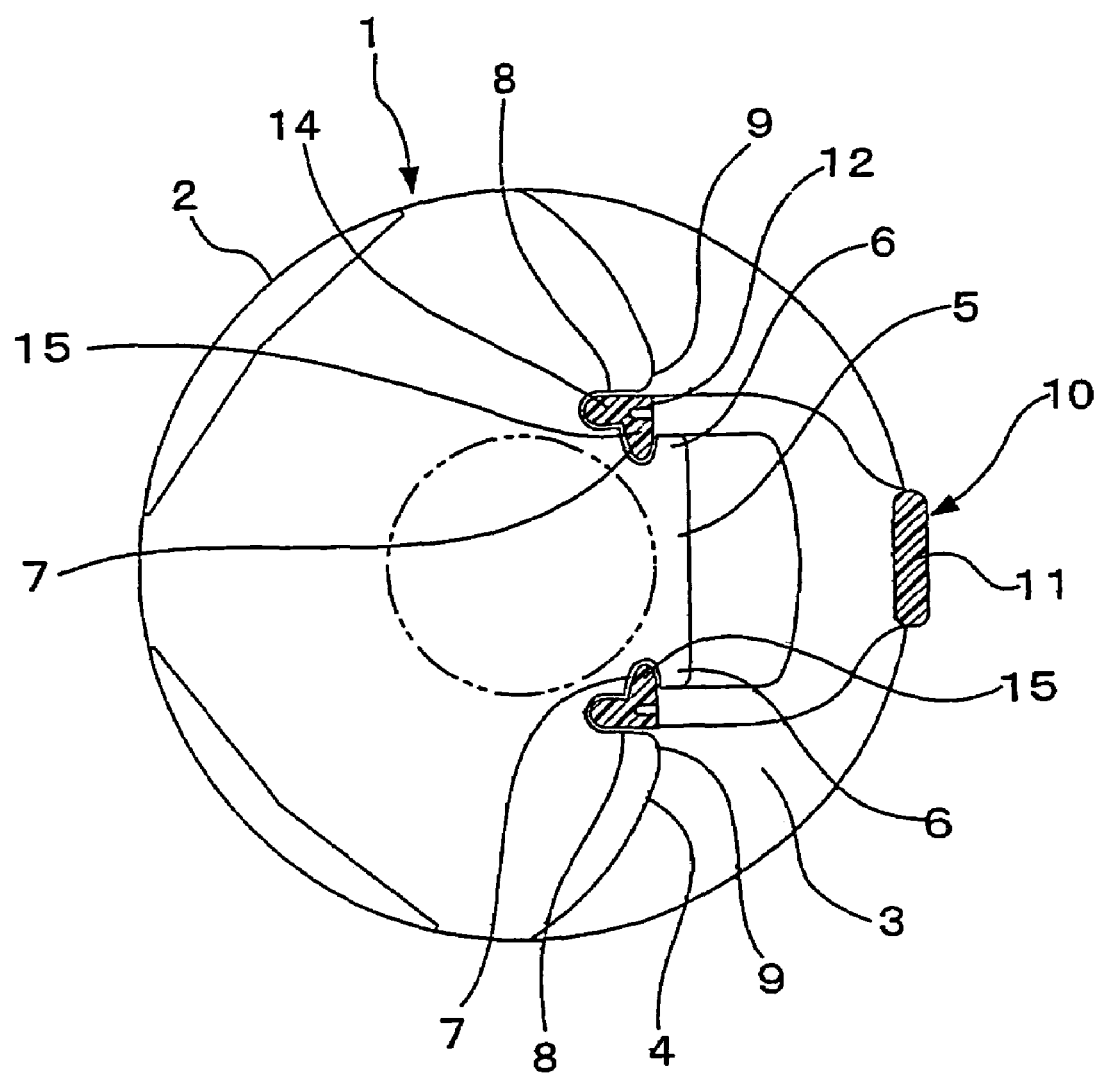
FIG. 3 is a cross-sectional plan view of the important portion of the bottle with a handle in the first embodiment shown in FIG. 1.
Figure 4:
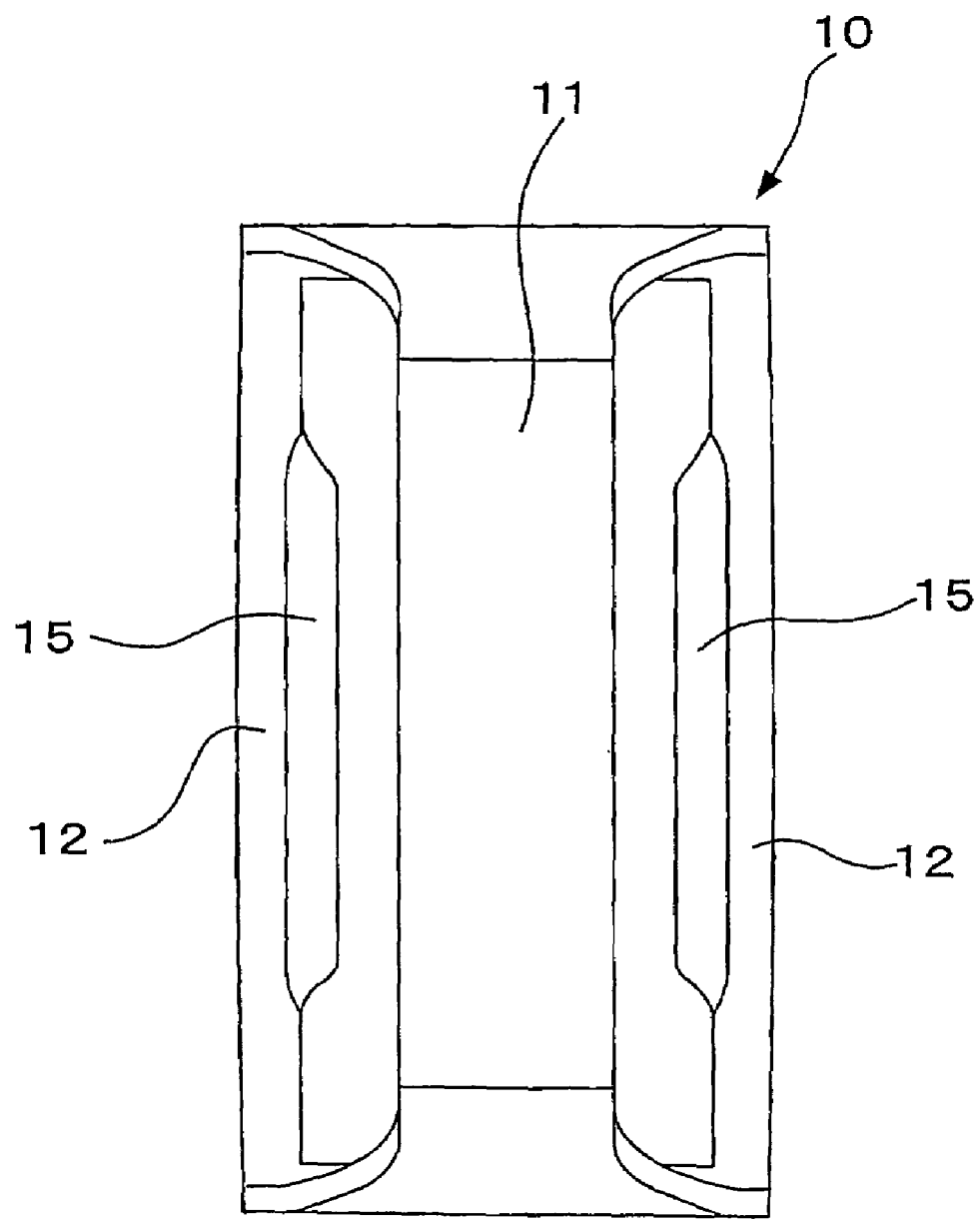
FIG. 4 is a rear view of the handle used in the first embodiment shown in FIG. 1.
Figure 5:
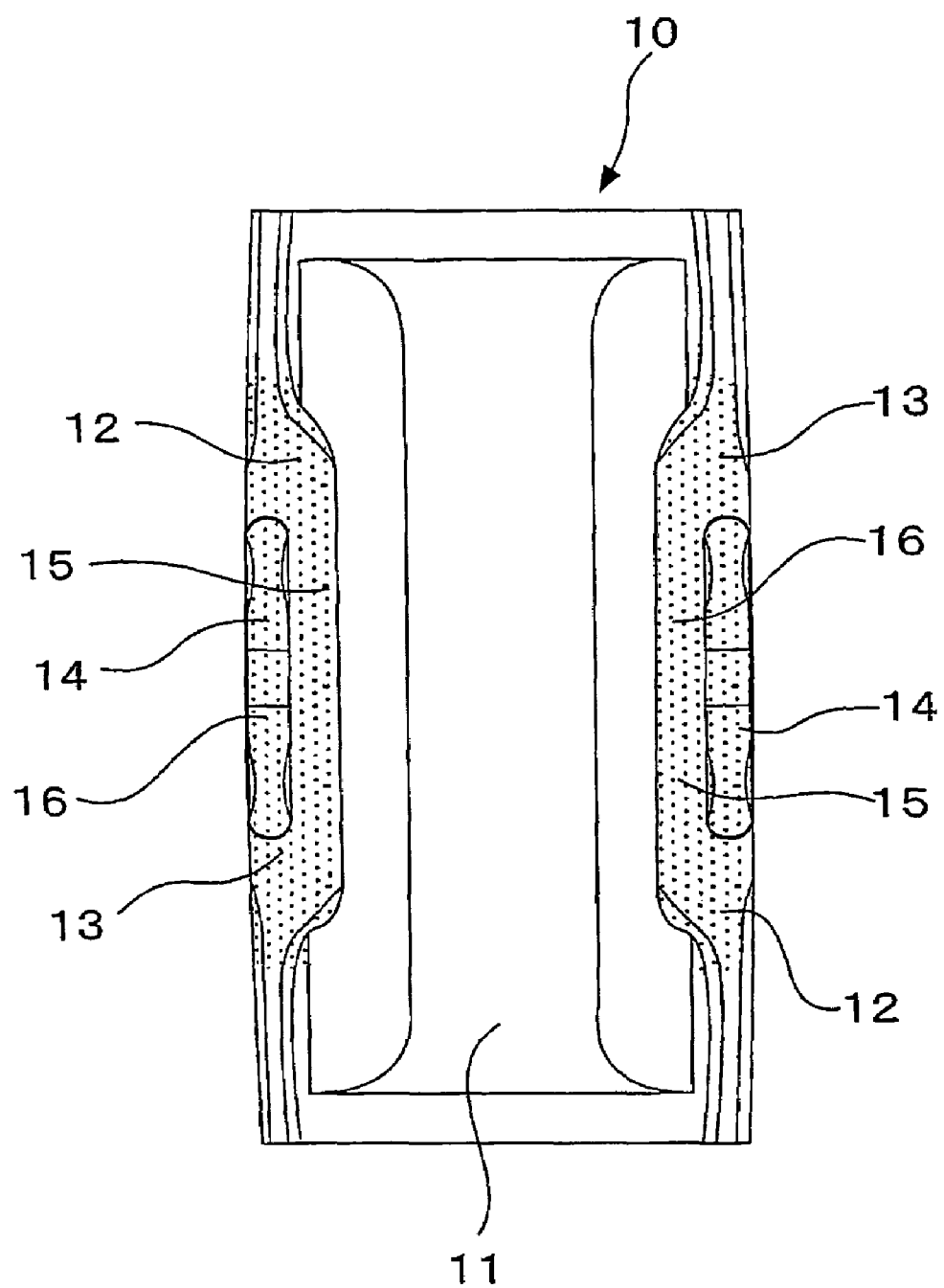
FIG. 5 is a front elevational view of the handle used in the first embodiment shown in FIG. 1.
Figure 6:
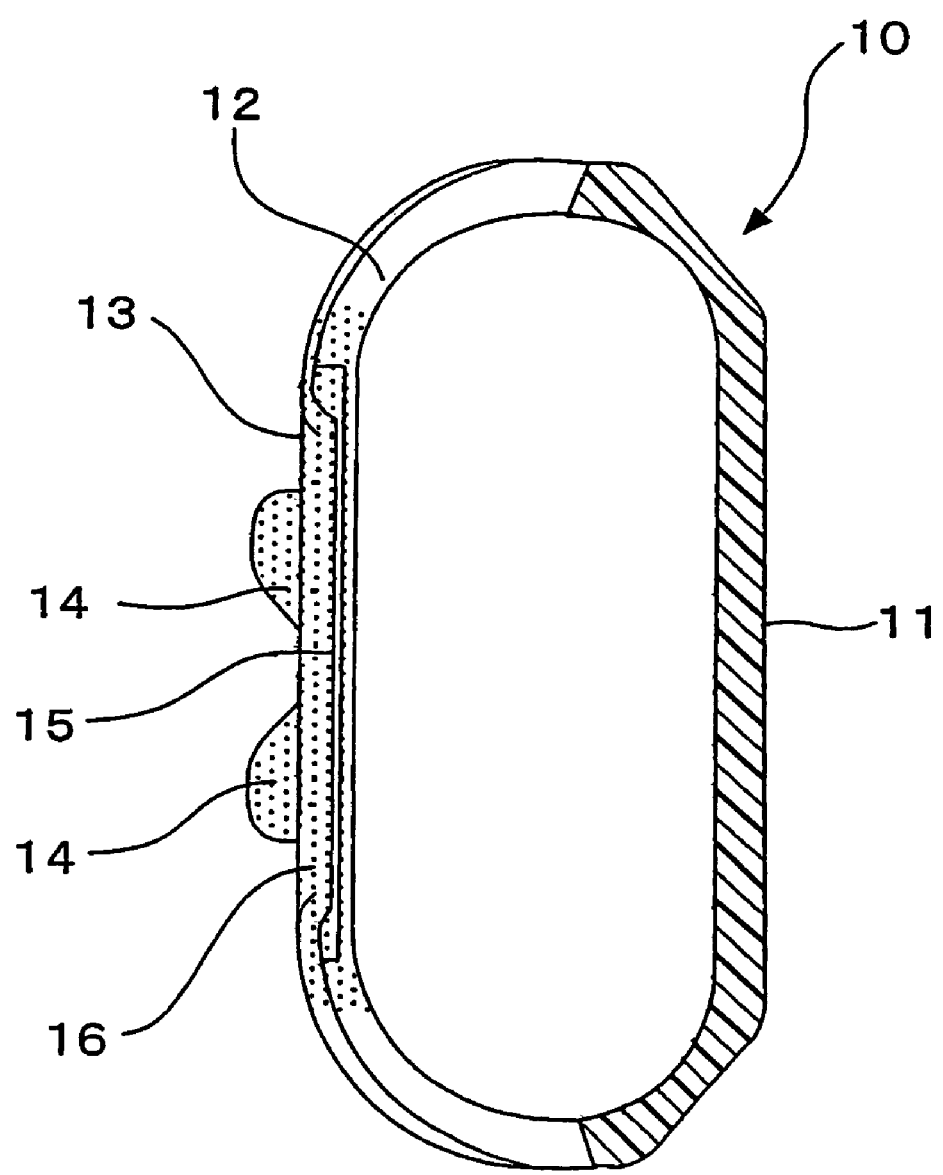
FIG. 6 is a cross-sectional side vertical view of the handle used in the first embodiment shown in FIG. 1.

This invention is further described in respect to preferred embodiments, now referring to the drawings. FIGS. 1–9 show the bottle with a hand in the first embodiment of this invention. The bottle of this invention comprises the bottle 1 and the handle 10. The bottle 1 is a biaxially drawn, blow-molded PET product of a large size (1.0 liter or more), and is provided with a recession 3 that has been caved in at the rear of the upper half of the bottomed cylindrical body 2. The handle 10 is an injection-molded PET product, which is fitted firmly to the recession 3 by an insert molding means.

The recession 3 of the bottle 1 comprises a vertical projecting wall 5, which is located in the center of recession bottom 4, where the flat projecting wall 5 stands upright, except for the upper and lower ends of the recession 3. The projecting wall 5 is relatively wide and extends vertically over the total height of the recession 3, with the wall height being roughly constant from side to side.

Expanded side portions 6 in the vertical ridge shape are disposed on both sides of the vertical projecting wall 5. Due to the existence of the expanded side portion 6, an engaging groove 7 is formed between each expanded side portion 6 and the recession bottom 4. Fitting holes 8 in a blank-hole shape are formed in the central area of the recession bottom 4, as taken along the height of the expanded side portions 6. In addition, a pair of step-like fitting-hole edges 9 is formed at positions opposite to the respective engaging grooves 7. The expanded side portions 6, the engaging grooves 7, the fitting holes 8, and the fitting-hole edges 9 together constitute the fitting portions of the bottle 1, by which the handle 10 is fitted to the bottle 1.

The handle 10 comprises a grip plate 11 in a vertical strip shape; a pair of fitting beams 12, which are straight in the center and are bent and connected to the grip plate 11 at both the upper and lower ends, with two beams being disposed in parallel to each other; a pair of engaging ridges 15 disposed straight on the sides of respective fitting beams 12 so as to face each other; and embedded projecting pieces 14 disposed in the central areas of both outer end faces 13 of the fitting beams 12.

The outer end faces 13 of the fitting beams 12 come in contact with the central portion of the recession bottom 4. Like this central portion, the outer end faces 13, too, are flat and straight. The fitting beams 12 are provided with the embedded projecting pieces 14 and the engaging ridges 15, along with these outer end faces 13, all of which constitute the fitting portions of the handle 10. The embedded projecting pieces 14 used for fitting the handle 10 have totally smooth and rounded surfaces so as to lower the friction resistance upon contact with the bottle 1.

A finely textured up-and-down pattern 16 has been formed in advance on the surfaces of at least the fitting portions or the inserts of the handle 10. As shown in FIG. 9, a referential photograph, the finely textured up-and-down pattern 16 spreads closely in the depth ranging from 5 to 20 micrometers. Hatching shown by dotted lines in FIGS. 5–8 indicates those portions where the above-described up-and-down pattern 16 has been formed closely.

The handle 10 is fitted to the bottle 1 by using the fitting portions of the handle 10 as the inserts and subjecting the bottle 1 to biaxial drawing and blow molding. In this molding operation, using the fitting portions of the handle 10 as the inserts, the fitting portions of the bottle 1, including the expanded side portions 6, the engaging grooves 7, the fitting holes 8, and the fitting-hole edges 9 that are in the positions opposite to the engaging grooves 7, are formed surrounding tightly the fitting portions of the handle 10 with no space between.

The bottle 1 is biaxially drawn and blow-molded at a molding temperature in the range of 90–120° C. The uppermost portions of the ups in the up-and-down pattern 16 are easily softened by the heat coming from the bottle, making the insert surfaces much slippery. The friction resistance caused by the contact between the bottle 1 and the surfaces of the handle inserts can be readily and securely reduced by the softened surfaces. Therefore, the bottle 1 can be safely subjected to the biaxial drawing and blow molding operation, without causing any rupture.

Figure 7:
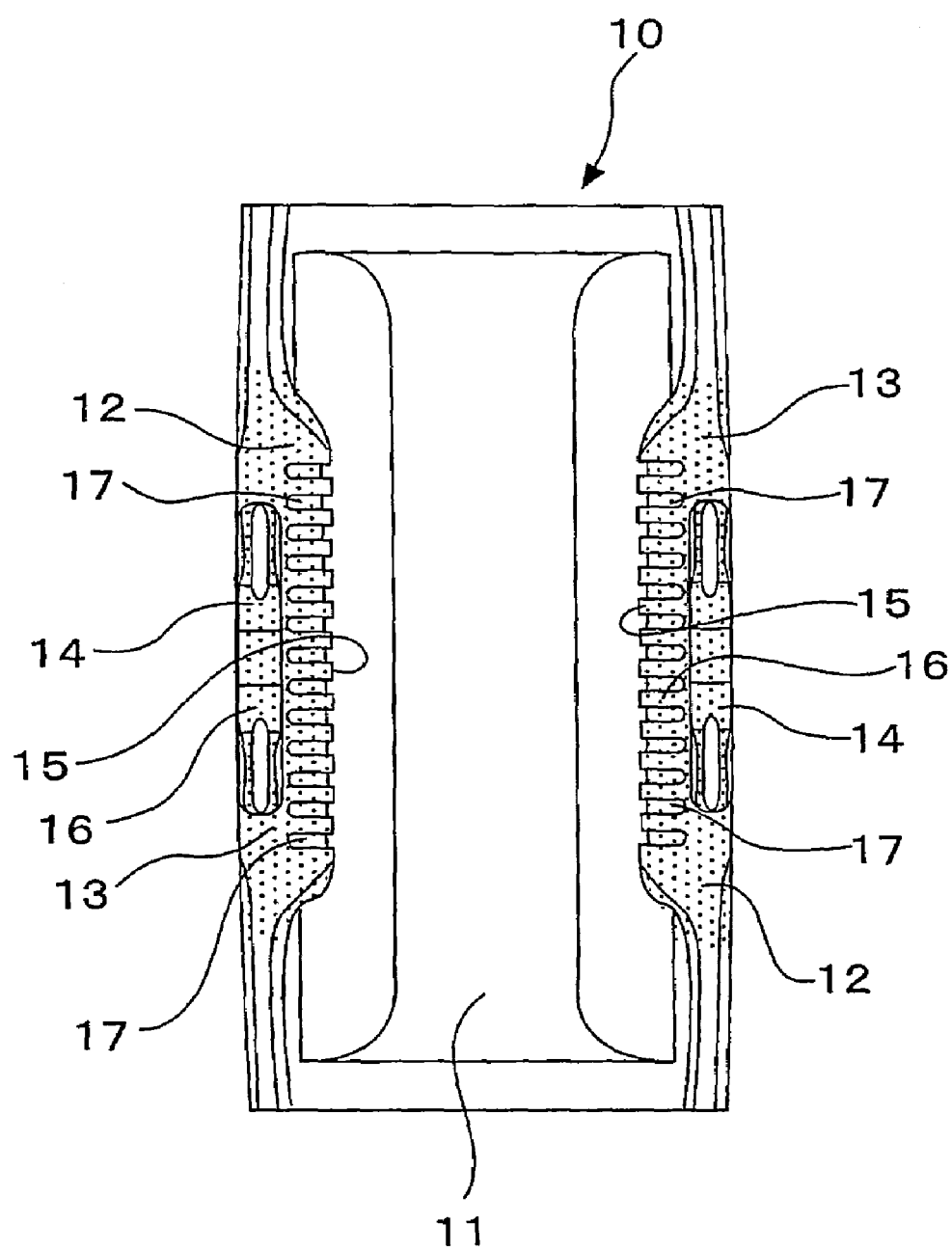
FIG. 7 is a front elevational view of another example of the handle in the first embodiment shown in FIG. 1.
Figure 8:
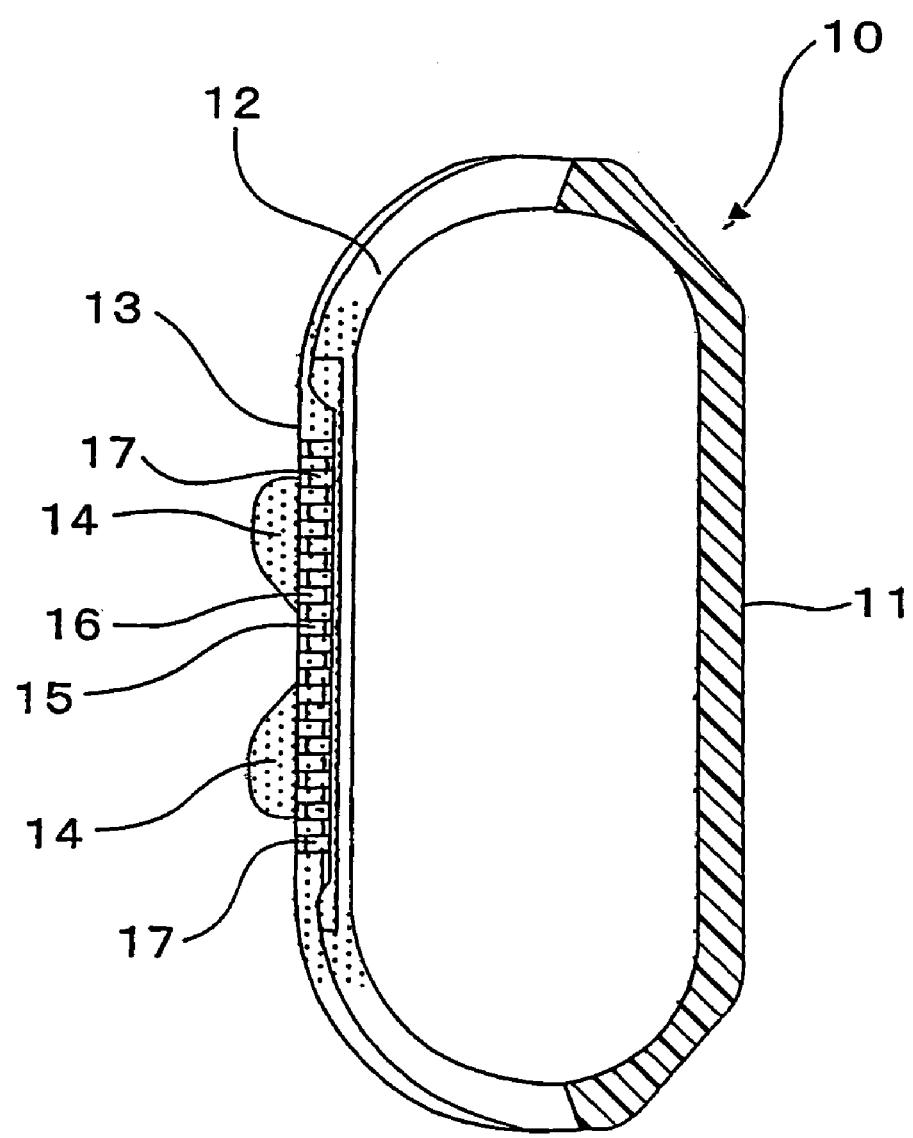
FIG. 8 is a cross-sectional side vertical view of the handle shown in FIG. 7.
Figure 9:
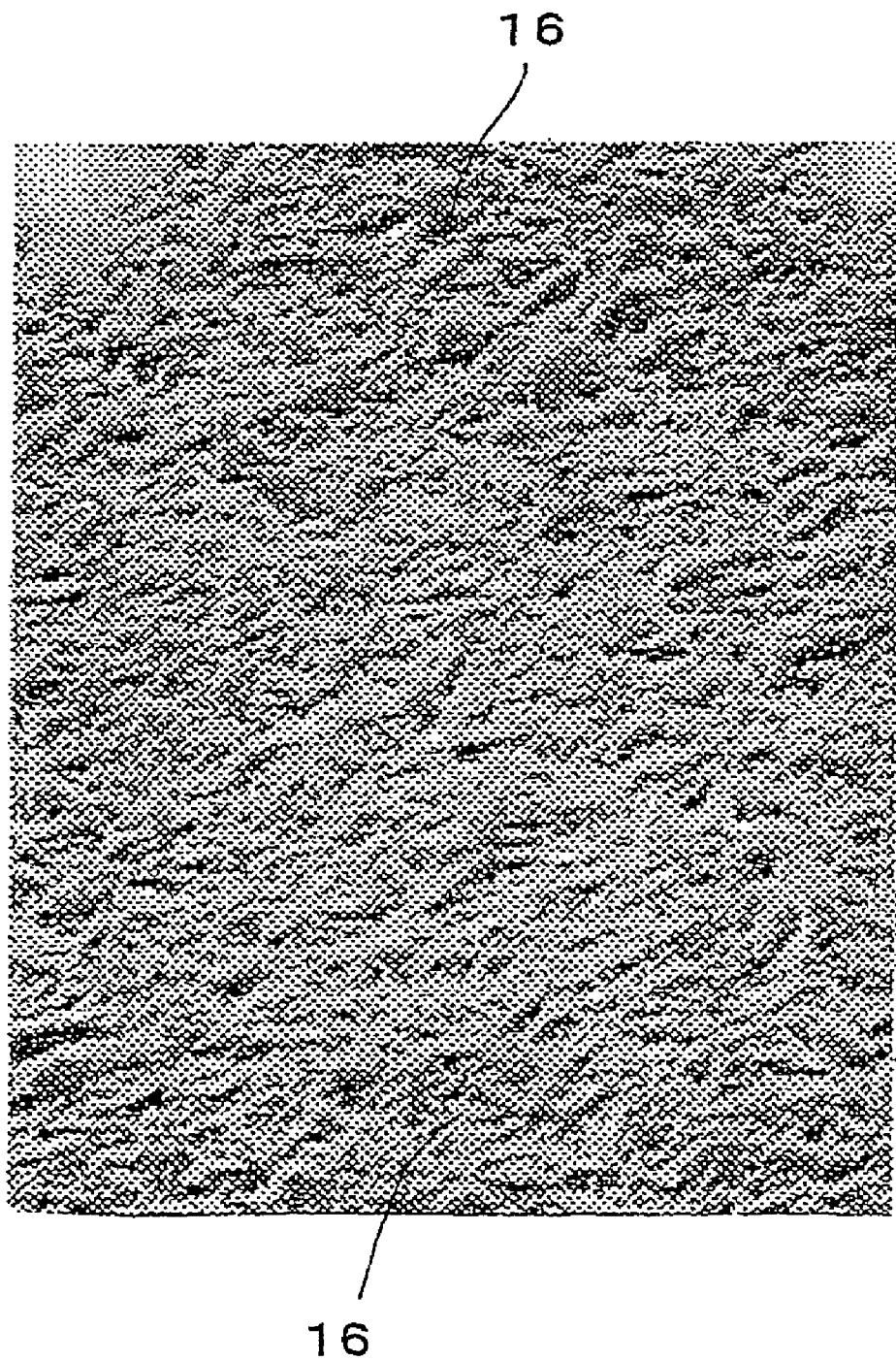
FIG. 9 is an enlarged referential photograph in which the surface of a handle insert has been zoomed to 1,000 magnifications.
Figure 10:
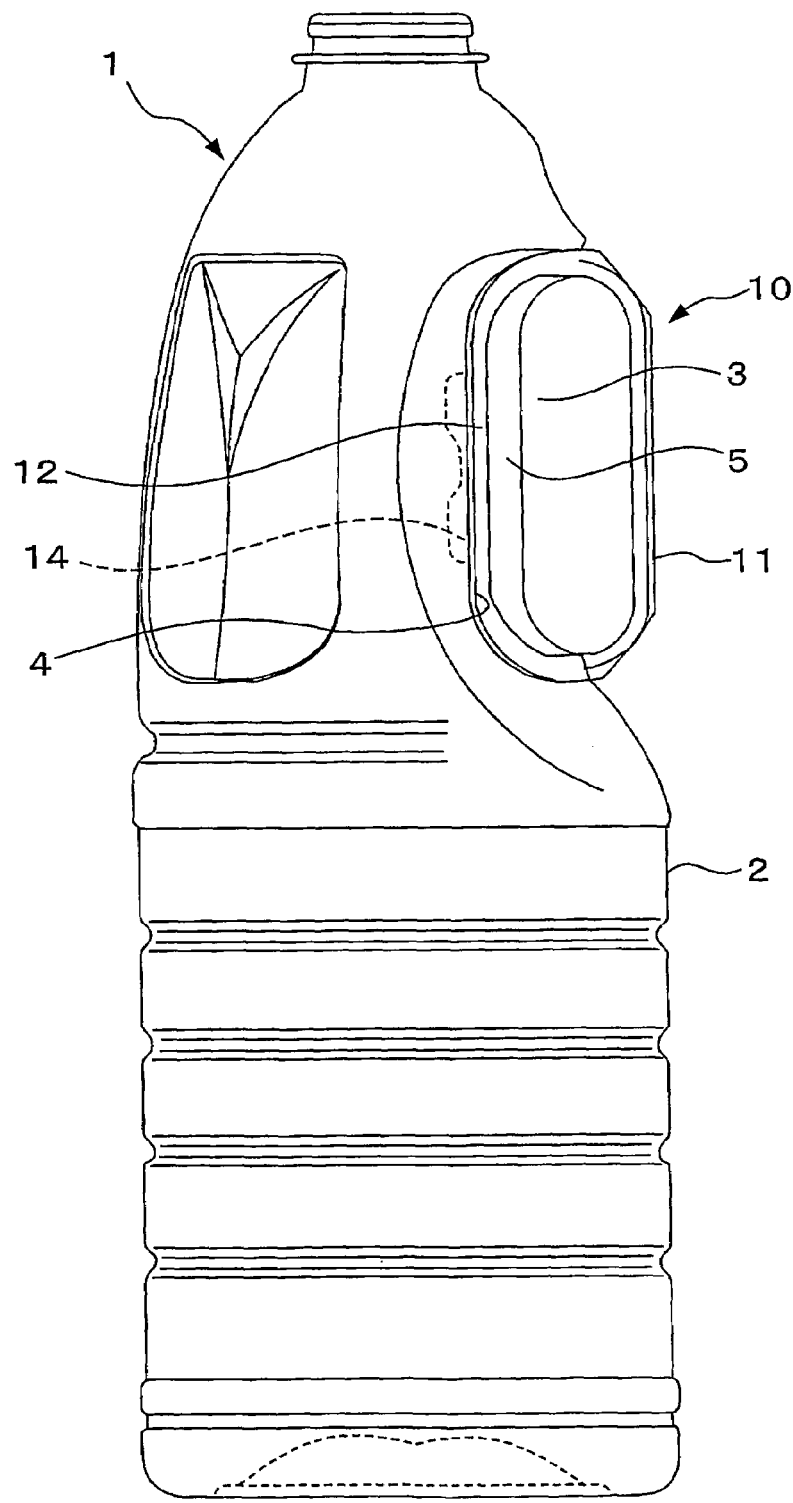
FIG. 10 is an entire side view of the bottle with a handle in the second embodiment of this invention.
Figure 11:
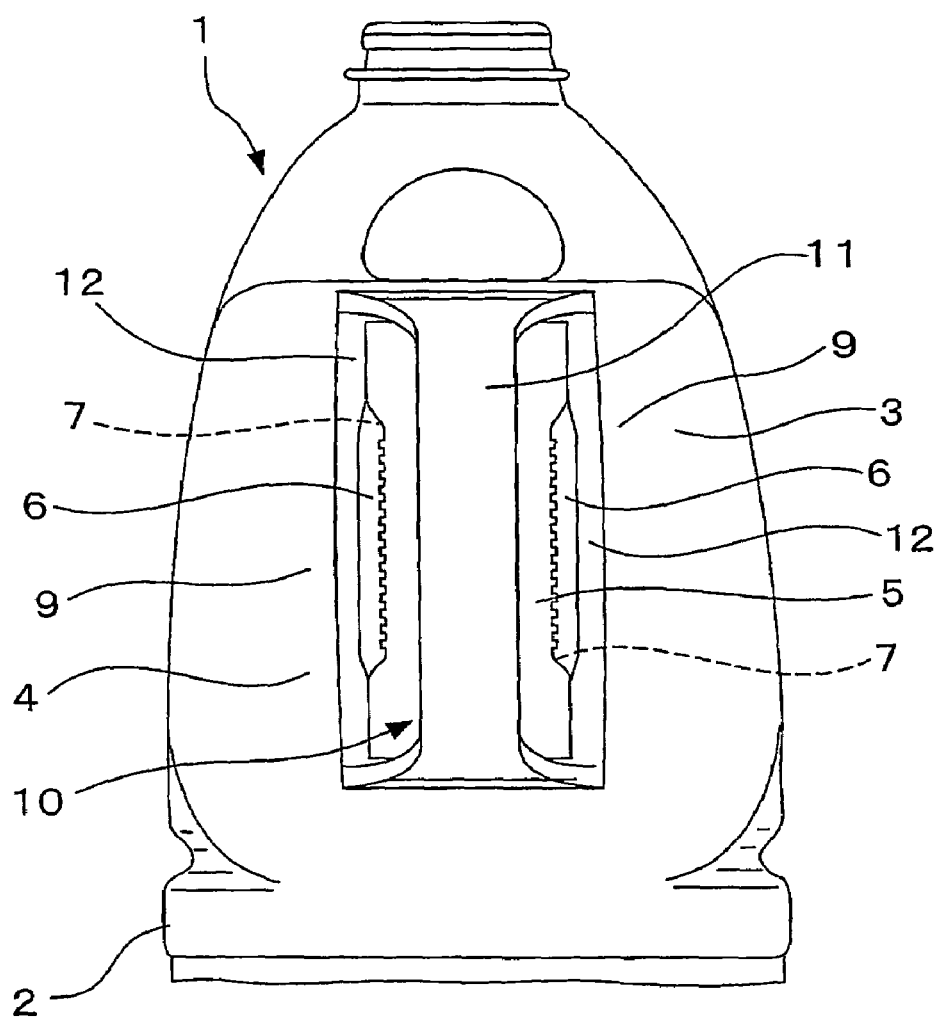
FIG. 11 is a rear view of the important portion of the bottle with a handle shown in FIG. 10.
Figure 12:
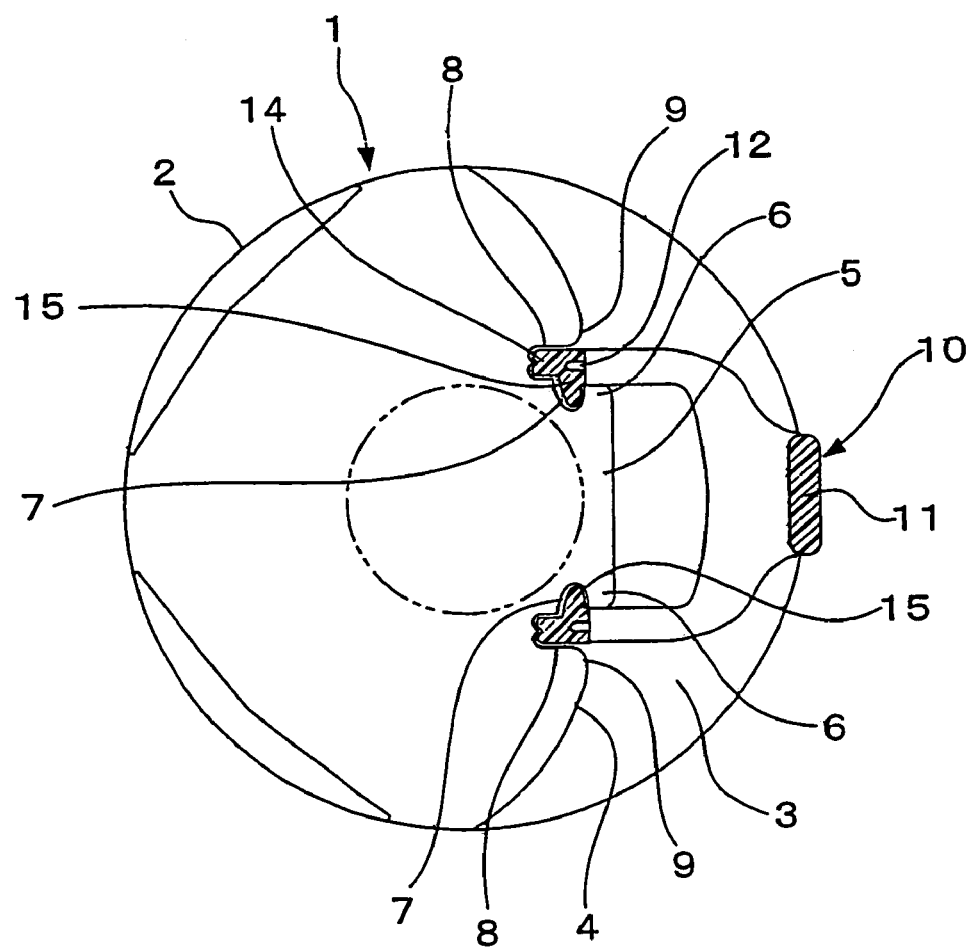
FIG. 12 is a cross-sectional plan view of the important portion of the bottle with a handle shown in FIG. 10.
Figure 13:
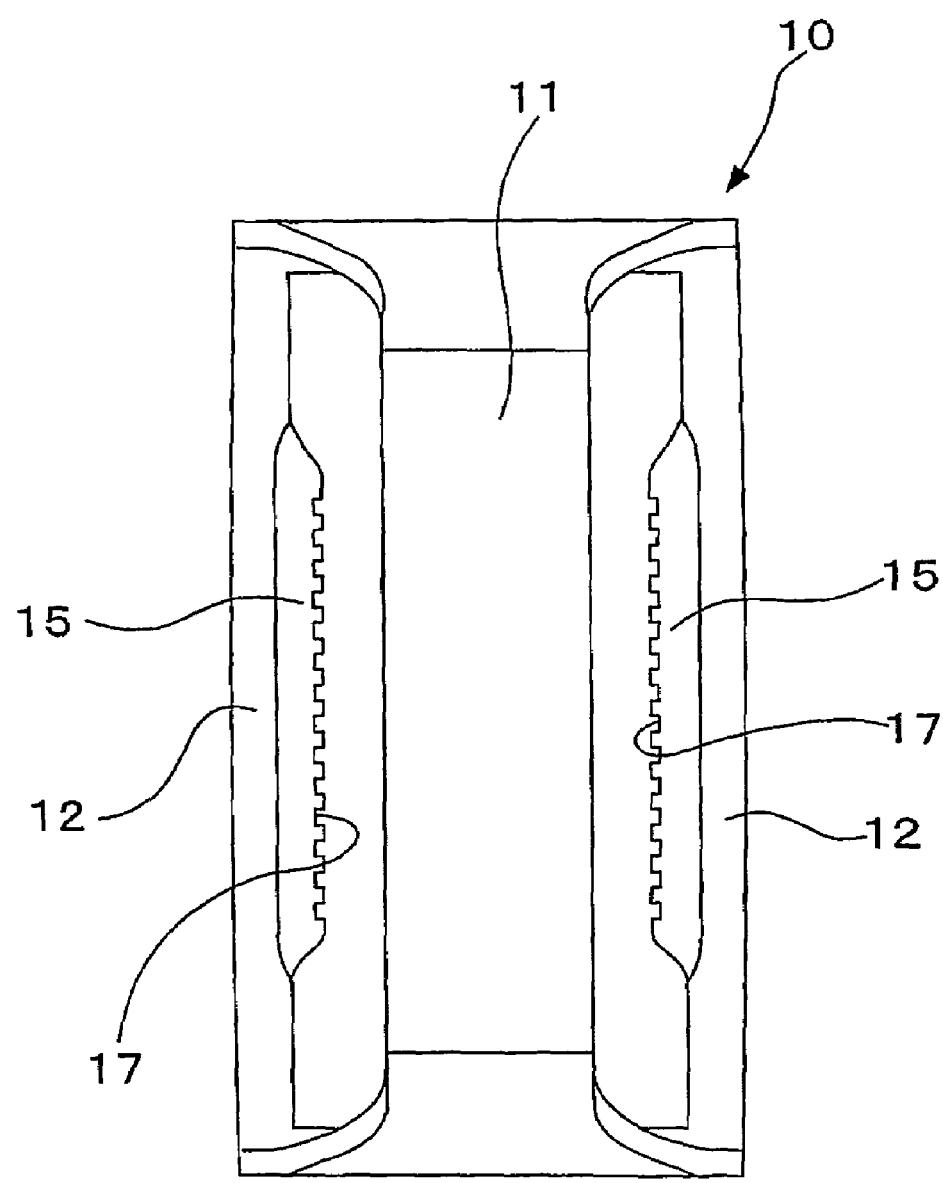
FIG. 13 is a rear view of the handle used in the second embodiment shown in FIG. 10.
Figure 14:
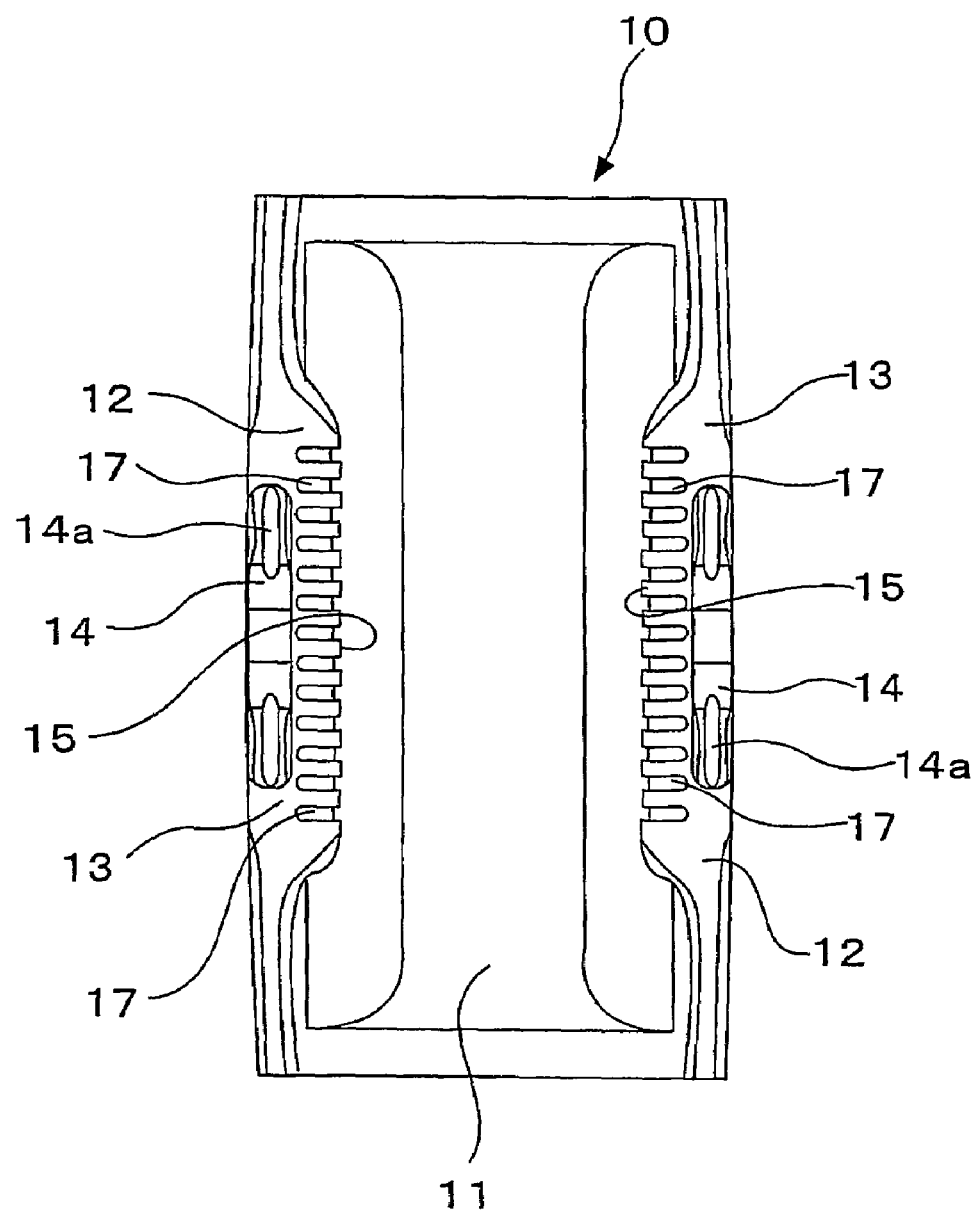
FIG. 14 is a front elevational view of the handle used in the second embodiment shown in FIG. 10.
Figure 15:
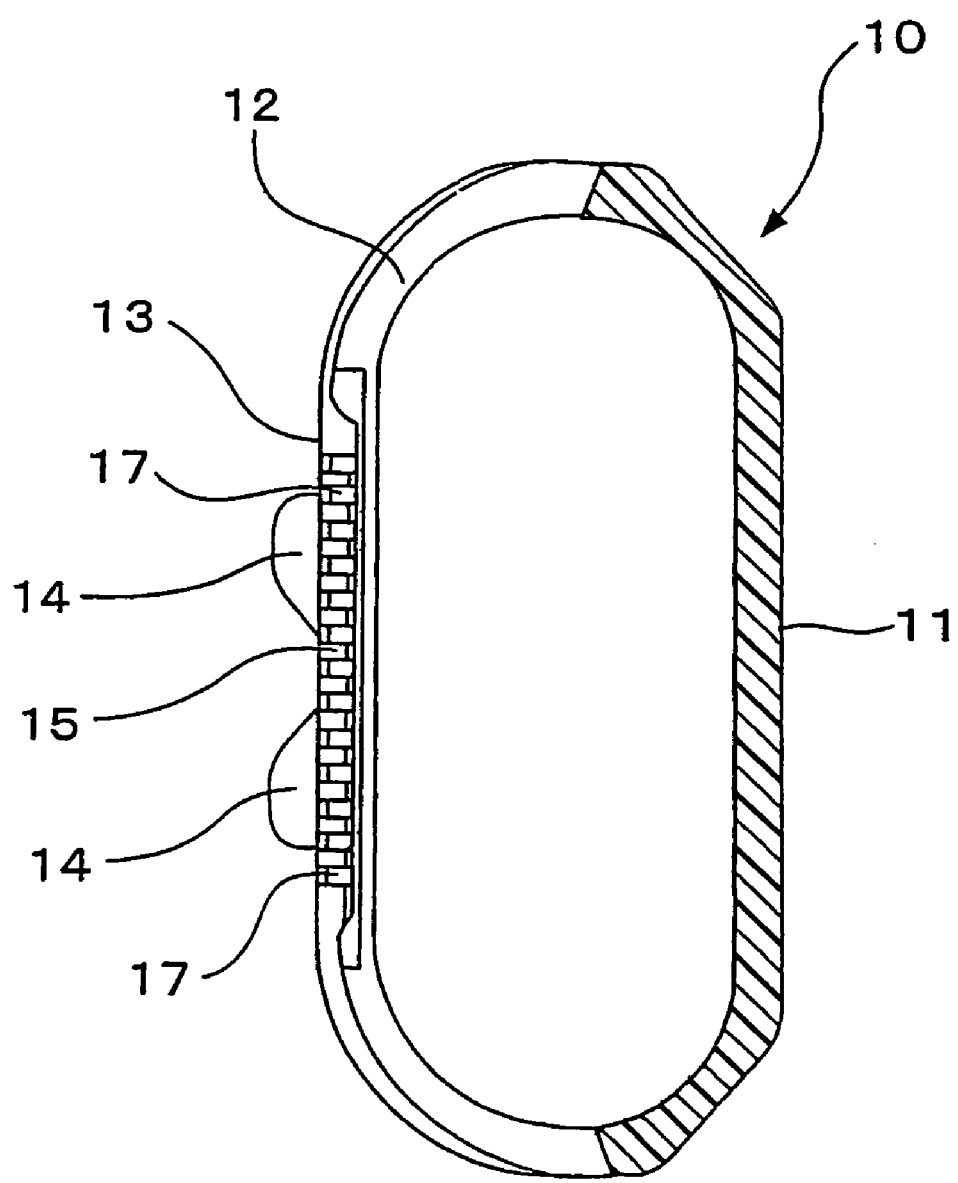
FIG. 15 is a cross-sectional side vertical view of the handle used in the second embodiment shown in FIG. 10.
Figure 16:
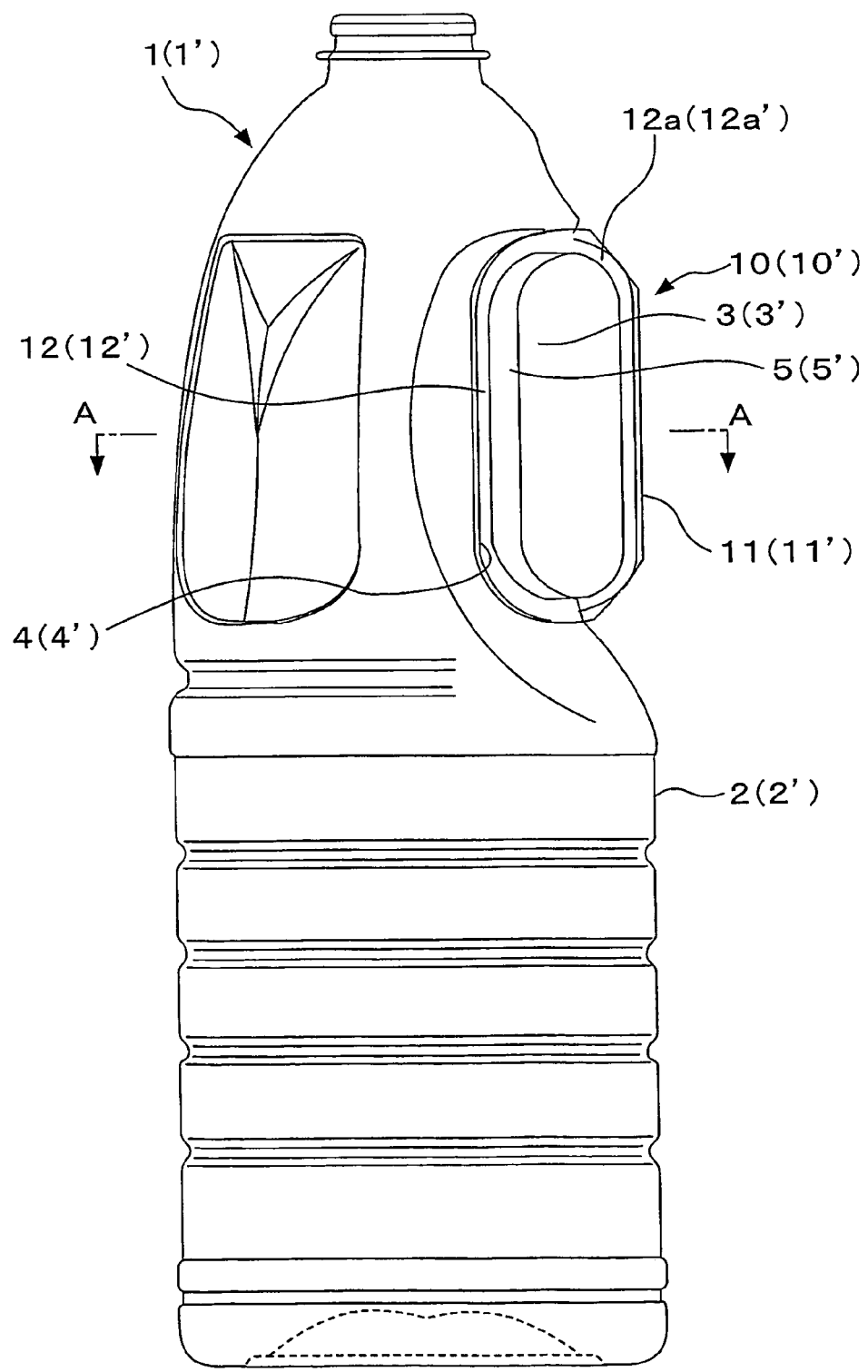
FIG. 16 is an entire view of the synthetic resin bottle with a handle in the third embodiment of this invention.
Figure 17:
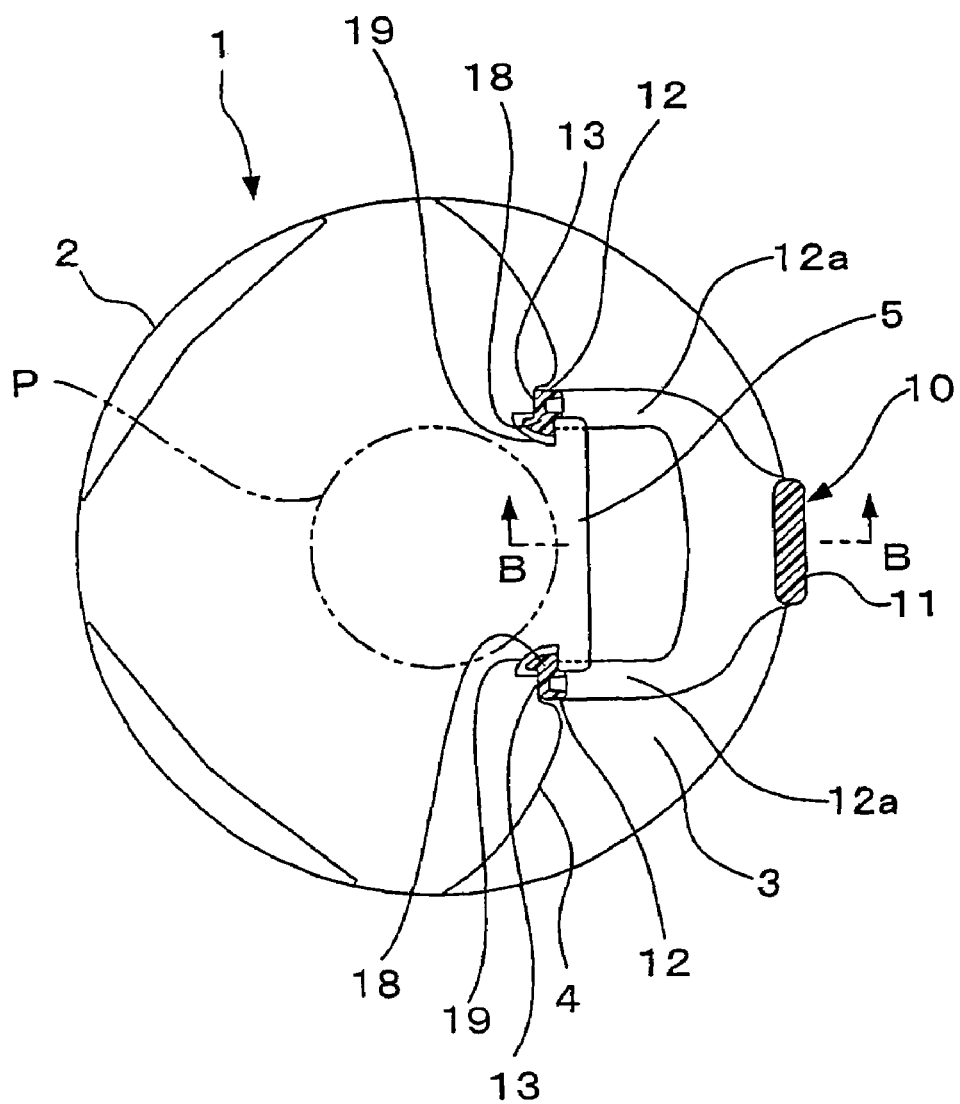
FIG. 17 is a cross-sectional plan view of the bottle with a handle, taken from line A—A in FIG. 16.
Figure 18:
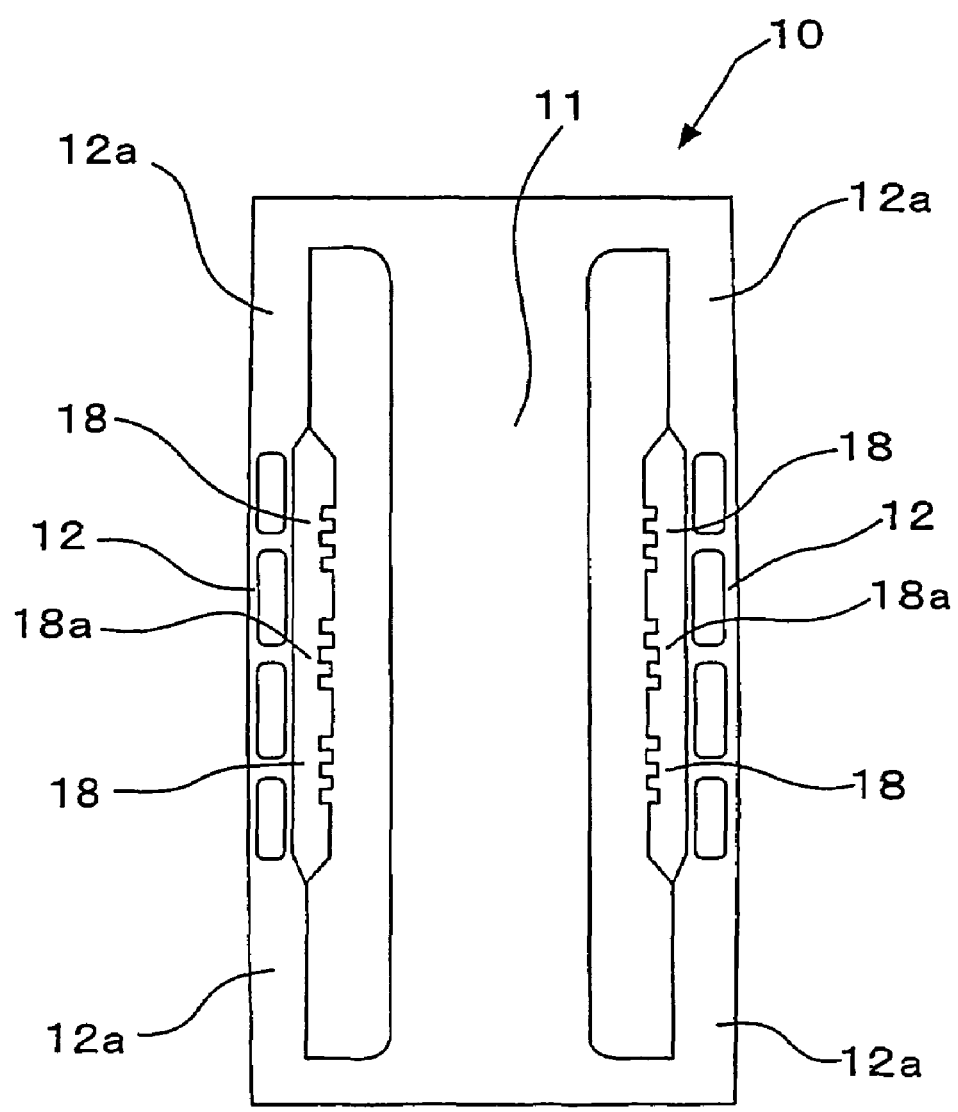
FIG. 18 is a rear view of the handle used in the third embodiment shown in FIG. 16.

FIGS. 7 and 8 show another example of the handle 10 in the first embodiment of this invention. Many lateral, narrow grooves 17 are disposed on the front sides of the engaging ridges 15, with each front side being curved toward the crest of the ridge. These narrow grooves 17 reduce the area of contact between the front sides of the engaging ridges 15 and the expanding wall portion of the bottle 1, thereby lowering the friction resistance caused by the contact between the bottle 1 and the engaging ridges 15.

FIGS. 10–15 show the bottle with a handle in the second embodiment of this invention. The bottle in this embodiment comprises the bottle 1 and the handle 10. The bottle 1 is a biaxially drawn, blow-molded PET product of a large size (1.0 liter or more), and is provided with a recession 3 that has been caved in at the rear of the upper half of the bottomed cylindrical body 2. The handle 10 is an injection-molded PET product, which is fitted firmly to the recession 3 by an insert molding means.

The recession 3 of the bottle 1 comprises a vertical projecting wall 5, which is located in the center of recession bottom 4, where the flat projecting wall 5 stands upright, except for the upper and lower ends of the recession 3. The vertical projecting wall 5 is relatively wide and extends vertically over the total height of the recession 3, with the wall height being roughly constant from side to side.

Expanded side portions 6 in the vertical ridge shape are disposed on both sides of the vertical projecting wall 5. Due to the existence of the expanded side portion 6, an engaging groove 7 is formed between each expanded side portion 6 and the recession bottom 4. Fitting holes 8 in a blank-hole shape are formed in the central area of the recession bottom 4, as taken along the height of the expanded side portions 6. In addition, a pair of step-like fitting-hole edges 9 is formed at positions opposite to the respective engaging grooves 7. The expanded side portions 6, the engaging grooves 7, the fitting holes 8, and the fitting-hole edges 9 together constitute the fitting portions of the bottle 1, by which the handle 10 is fitted to the bottle 1.

The handle 10 comprises a grip plate 11 in a vertical strip shape; a pair of fitting beams 12, which are straight in the center and are bent and connected to the grip plate 11 at both the upper and lower ends, with two beams being disposed in parallel to each other; a pair of engaging ridges 15 disposed straight on the sides of respective fitting beams 12 so as to face each other; and embedded projecting pieces 14 disposed in the central areas of both outer end faces 13 of the fitting beams 12.

The outer end faces 13 of the fitting beams 12 come in contact with the central portion of the recession bottom 4. Like this central portion, the outer end faces 13, too, are flat and straight. The fitting beams 12 are provided with the embedded projecting pieces 14 and the engaging ridges 15, along with these outer end faces 13, all of which constitute the fitting portions of the handle 10. The embedded projecting pieces 14 used for fitting the handle 10 have totally smooth and rounded surfaces. Each piece 14 has a forefront groove 14a in the stick-out end face so as to lower the contact friction resistance when the embedded projecting pieces 14 come in contact with the wall of the bottle 1. Similarly, many lateral, narrow grooves 17 are disposed in the front surfaces of the engaging ridges 15 to lower the friction resistance upon contact with the bottle 1.

The handle 10 is fitted to the bottle 1 by using the fitting portions of the handle 10 as the inserts and subjecting the bottle 1 to biaxial drawing and blow molding.

In the biaxial drawing and blow molding of the bottle 1, using the fitting portions of the handle 10 as the inserts, the fitting portions of the bottle 1, including the expanded side portions 6, the engaging grooves 7, the fitting holes 8, and the fitting-hole edges 9 that are in the positions opposite to the engaging grooves 7, are formed surrounding tightly the fitting portions of the handle 10 with no space.

For the convenience of operation at the time when the bottle 1 is biaxially drawn and blow-molded, the embedded projecting pieces 14 of the handle 10 have been designed to have totally smooth rounded surfaces. At the same time, the area of contact of the embedded projecting pieces 14 with the bottle 1 has been reduced by notching the forefront grooves 14a of a vertical slit type in the stick-out end faces of the embedded projecting pieces 14. Due to these measures, the contact friction resistance is neither biased locally nor increased, even if such resistance occurs between the embedded projecting pieces 14 and the wall portion of the bottle 1 that comes in contact with the embedded projecting pieces 14. Therefore, the bottle 1 can be safely subjected to the biaxial drawing and blow molding operation, without causing any rupture.

Due to the action of the lateral narrow grooves 17, the bottle 1 can be smoothly drawn and deformed because these grooves 17 serve to limit to a low level the contact friction resistance that develops between the engaging ridges 15 and the bottle 1. When a wall portion of the bottle 1 is drawn and displaced upon contact with the engaging ridges 15, this portion gets around the engaging ridges 15 smoothly and reaches the rear side, thus forming the expanded side portions 6 stably without fail.

FIGS. 16–23 show the bottle with a handle in the third embodiment of this invention. The bottle in this third embodiment comprises the bottle 1 and the handle 10. The bottle 1 is a biaxially drawn, blow-molded PET product of a large size (1.0 liter or more), and is provided with a recession 3 that has been caved in at the rear of the upper half of the bottomed cylindrical body 2. The handle 10 is an injection-molded PET product, and is fitted firmly to the recession 3 by an insert molding means.

The recession 3 of the bottle 1 comprises a vertical projecting wall 5, which is located in the center of recession bottom 4, where the flat projecting wall 5 stands upright, except for the upper and lower ends of the recession 3. This wall 5 is relatively wide and extends vertically over the total height of the recession 3, with the wall height being roughly constant from side to side (See FIG. 17).

FIGS. 18–21 show the handle 10. A pair of fitting beams 12 in a straight bar shape is disposed in parallel to each other and is connected to the vertical grip plate 11 through the intermediary of the connecting arms 12a in a curved rod shape. The embedded ridges 18 are a form of the embedded projecting portions K and are located near the corner set by the outer end face 13 and the opposed side 12d of each fitting beam 12. The cross-section of the mbedded ridges 18 has a generally triangular shape formed by one side of the right angle going down from the opposed side in the almost vertical direction and the other side of the right angle extending perpendicularly from the outer end face 12d (See FIG. 21(a)).

The end face 19 of the embedded ridge 18 corresponds to the hypotenuse of a right-angled triangle in its cross-section, and forms a gentle arc. Many lateral, narrow grooves 25 are notched in the outer peripheral surface of each embedded ridge 18. This device improves the slidability of the PET preform P when it is in the softened state during the blow molding.

The embedded ridge 18 in this embodiment is a two-peak ridge with a low area 18a in between. In this low area 18a, the engaging ridge 15 is disposed as an insert, which has a shape obtained by deleting a portion perpendicular to the outer end face 13 of the fitting beam 12 from the cross-section of the embedded ridge 18 (See FIG. 21(b)). The two-peak form of the embedded ridge 18 is intended to reduce the handle weight and to improve the fitting strength further by allowing the wall of the PET bottle to get around this low area 18a. In designing an embedded ridge 18, one skilled in the art can decide on whether the two-peak form is adequate or not, giving consideration to the moldability, because a ridge without the low area 18a has also full fitting strength. In addition, the embedded ridge 18 may have three or more peaks, depending on the purpose.

The surfaces of the curved connecting arms 12a, or at least those surfaces thereof that come in contact with the bottle 1, have been smoothed in advance. This improves the slidability of the drawn and expanding PET preform P during the biaxial drawing and blow molding operation using the handle 10 as the insert, and also prevents the bottle 1 from getting damages caused by friction.

Figure 22:
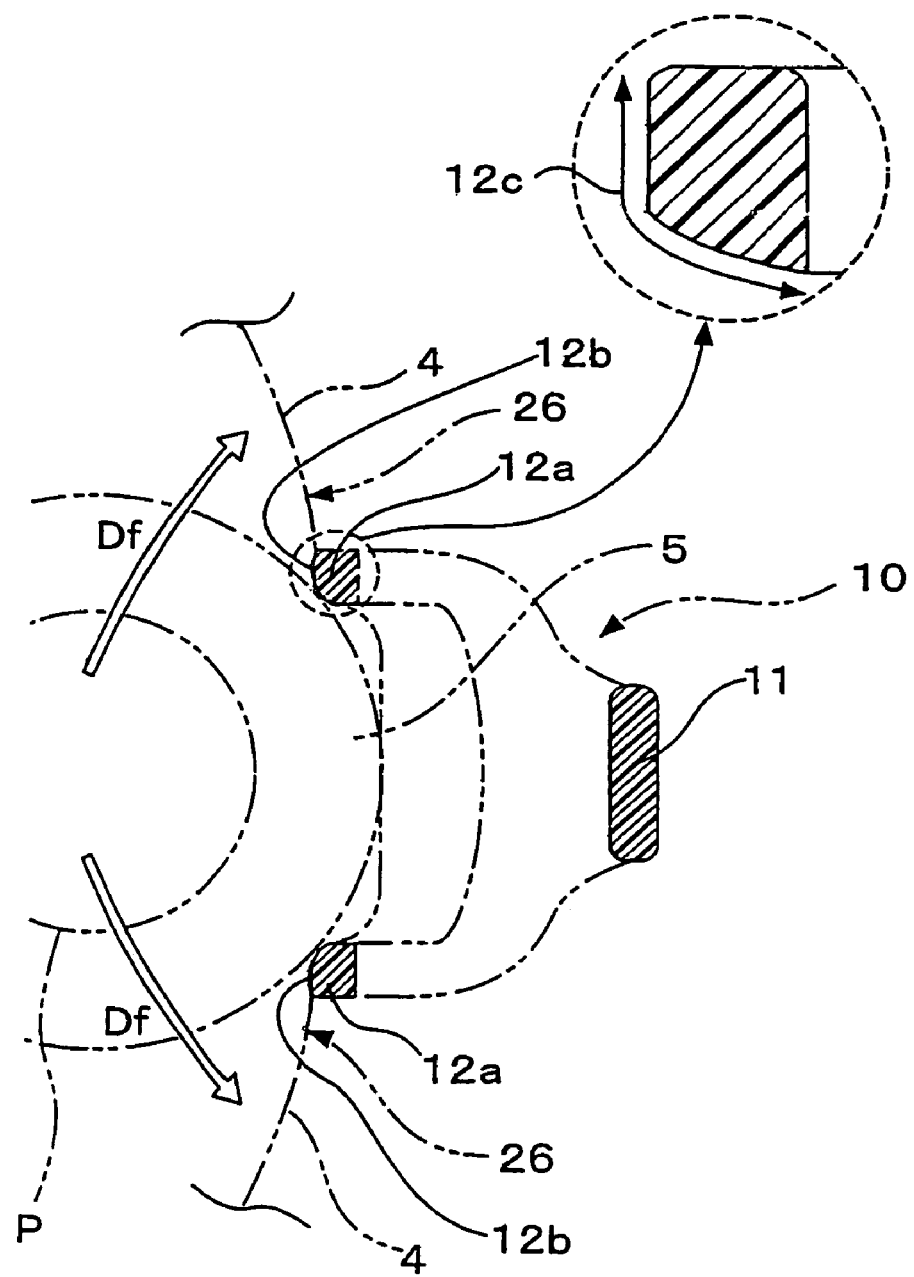
FIG. 22 is an explanatory diagram shown in a cross-sectional plan view of the bottle with a handle, taken from line F—F in FIG. 19.

In the third embodiment of this invention, the pair of upper connecting arms 12a has been smoothed over the range indicated by 12C in FIG. 22. Depending on the abrasion development situation, the area to be smoothed can be selected. For example, the pair of lower connecting arms 12a can be smoothed, if necessary.

The handle 10 is fitted to the bottle 1 by using the handle 10 as the insert and biaxially drawing and blow-molding the bottle 1. At the time of blow molding, the embedded ridge 18 is disposed at a position opposite the neighborhood of outer wall of the preform P in such a manner that the front end face 19 of the embedded ridge 18 is stuck out. The more close to the connecting portion of the grip plate 11 is the outer end face 12b of the connecting arms 12a positioned, the more distant from the outer wall of the preform P it stays, as compared with the front end face 19 of the embedded ridge 18 and the outer end face 13 of the fitting beam 12 (See FIG. 17).

The PET preform P is expanded by air blow. At the initial stage of drawing, the preform P comes in contact with the front end face 19, covers it, and then gets around both corners 21a and 21b. At one corner 21a, the preform P deforms along the rear side 20a of the embedded ridge 18 and reaches the opposed side 12d. At the other corner 21b, the preform P deforms along the left side 20b of the embedded ridge 18 and the outer end face 13 of the fitting beam 12. Finally the preform P reaches the edge of the outer side 12e of the fitting beam 12, and thus, the insertion of the handle 10 into the recession 3 of the bottle 1 is completed. Since the embedded ridge 18 has a generally triangular shape in its cross-section, the PET preform P is allowed to get around the embedded ridge 18 tightly along its outer surfaces (See FIG. 21(a)).

Figure 19:
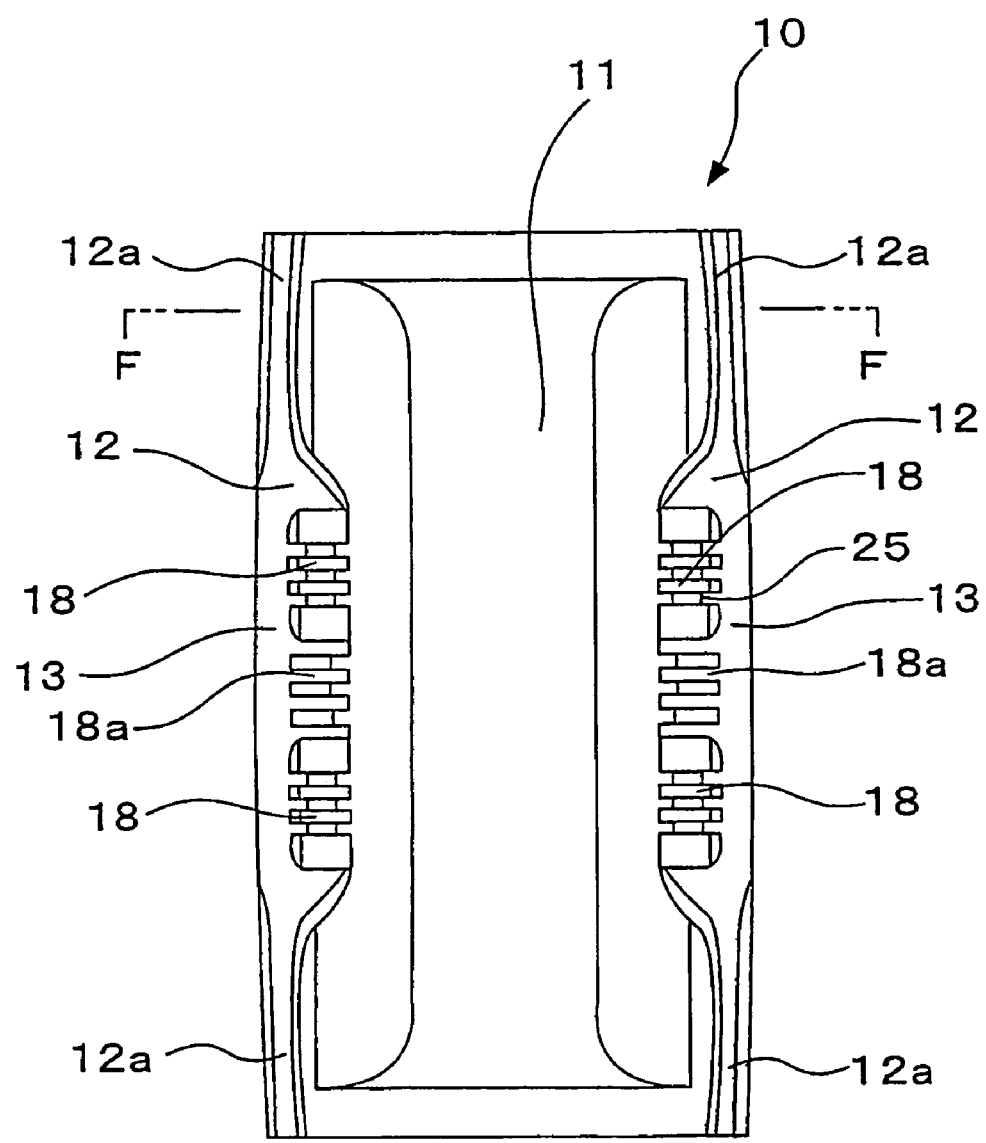
FIG. 19 is a front elevational view of the handle used in the third embodiment shown in FIG. 16.
Figure 20:
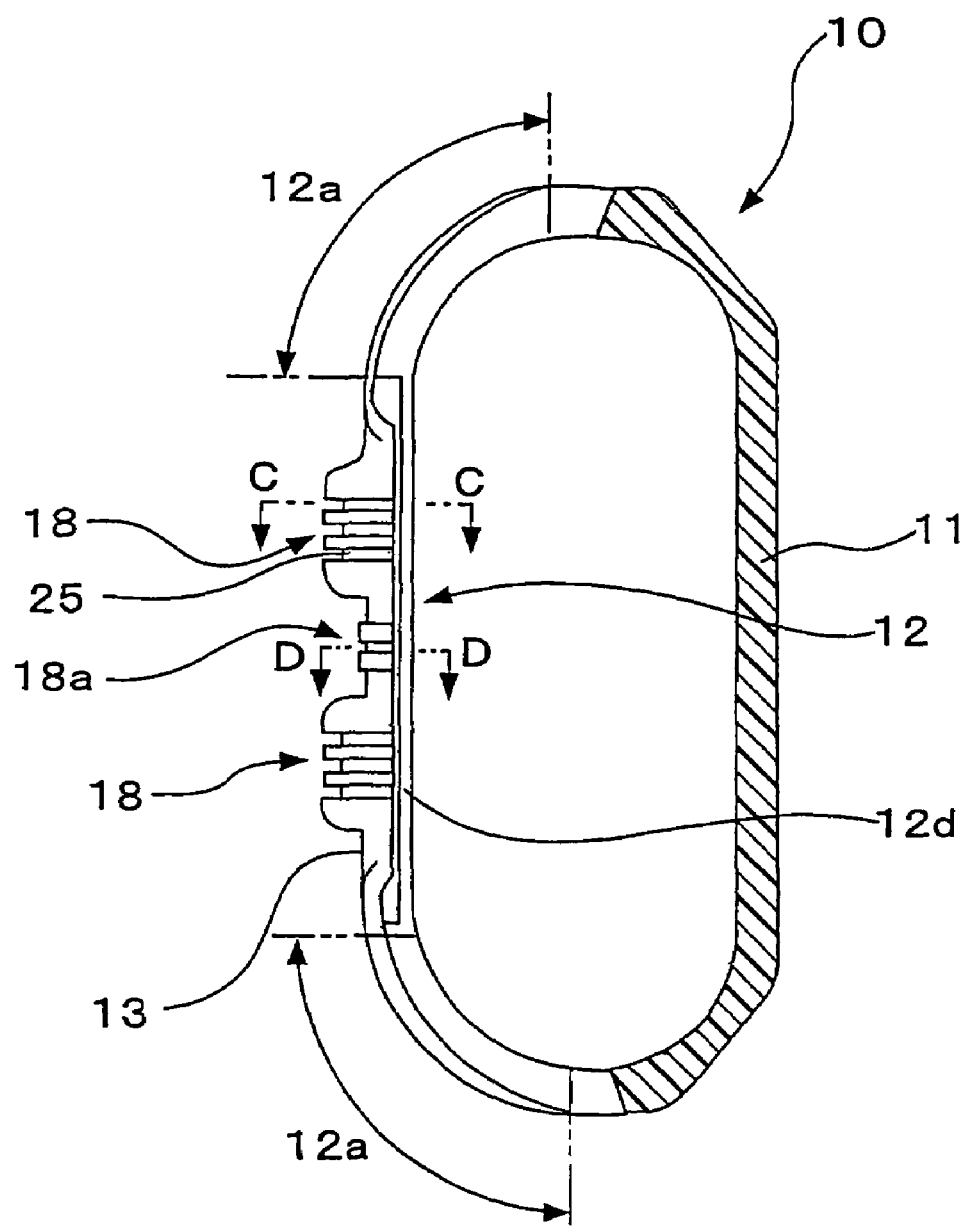
FIG. 20 is a cross-sectional side vertical view of the handle used in the third embodiment shown in FIG. 16, taken from line B—B in FIG. 17.
Figure 21:
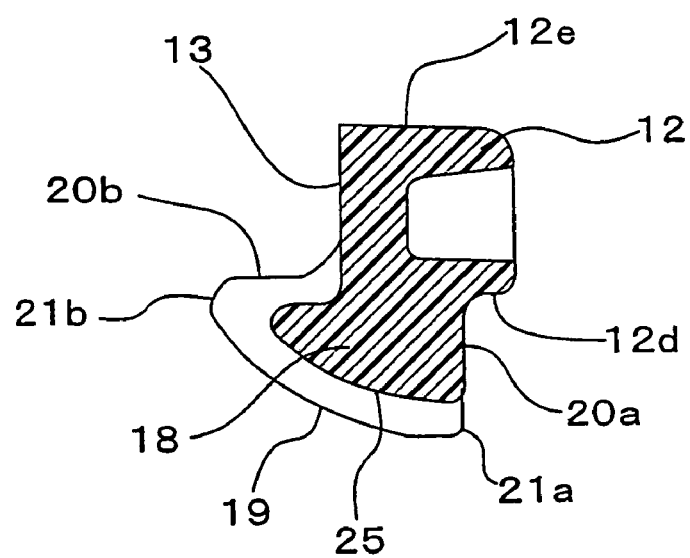
FIGS. 21($a$) and 21($b$) are cross-sectional plan views of important portion of an embedded ridge, taken from line C—C and D—D in FIG. 20.
Figure 21:
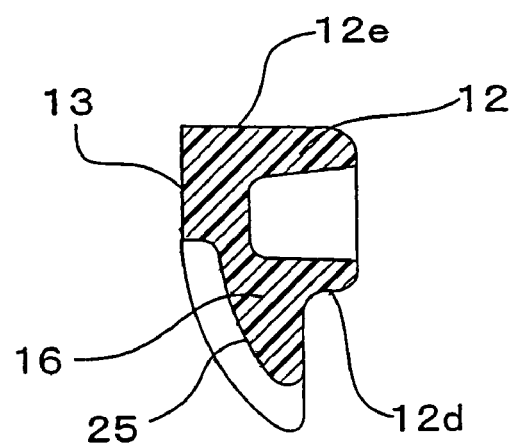

In the meantime, FIG. 22 is an explanatory diagram showing estimated deformation of the preform P at a height of the well upper portion of each connecting arms 12a near the connection to the grip plate 11 (the height of line F—F in FIG. 19). The preform P presumably comes in contact with the end face 12b of the connecting arms 12a in the state in which the preform P has been drawn and expanded considerably more than when the preform P has come in contact with the front end faces 19 of the embedded ridges 18 or with the outer end faces 13 of the fitting beams 12. Then, the preform P is further drawn and deformed, while sliding along the end face 12b of the connecting arms 12a without getting around the connecting arms 12*a* so largely as to reach the rear side. The arrows Df in FIG. 22 indicate the estimated directions in which the preform P is expanded and deformed.

Bottles with a 4-liter capacity in the shape shown in the third embodiment were blow-molded to determine the smoothing effect of especially the connecting arms used in the bottle of this invention. For the non-smoothed surfaces of the connecting arms 12*a*, abrasions were found at a high frequency, especially at positions near the upper connecting arms (Abrasive wall portion 26 in FIG. 22). These abrasions could have been prevented from occurring by smoothing beforehand those areas where expanding preform P comes in contact with the upper connecting arms 12*a* (Smoothed area 12*c* in FIG. 22).

Figure 23:
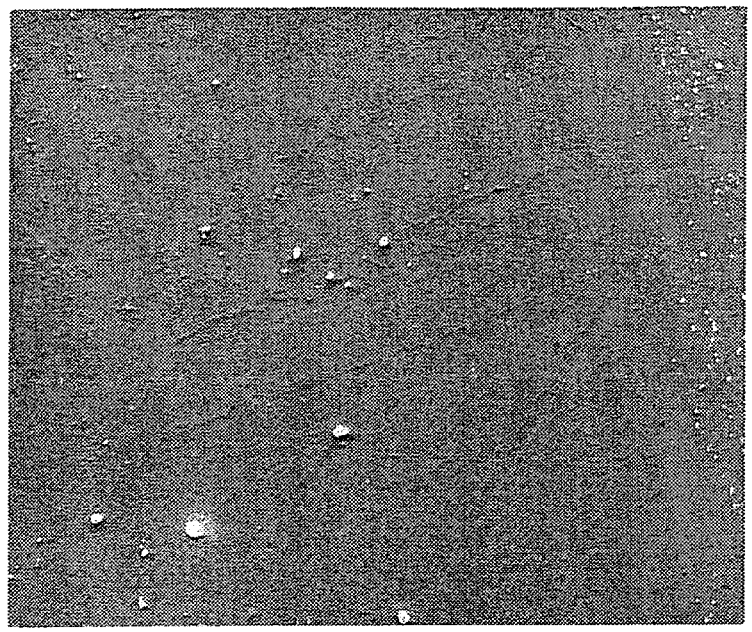
FIGS. 23($a$) and 23($b$) are referential photographs showing magnified surfaces of the connecting arms of the handle before (b) and after (a) the smoothing treatment.
Figure 23:
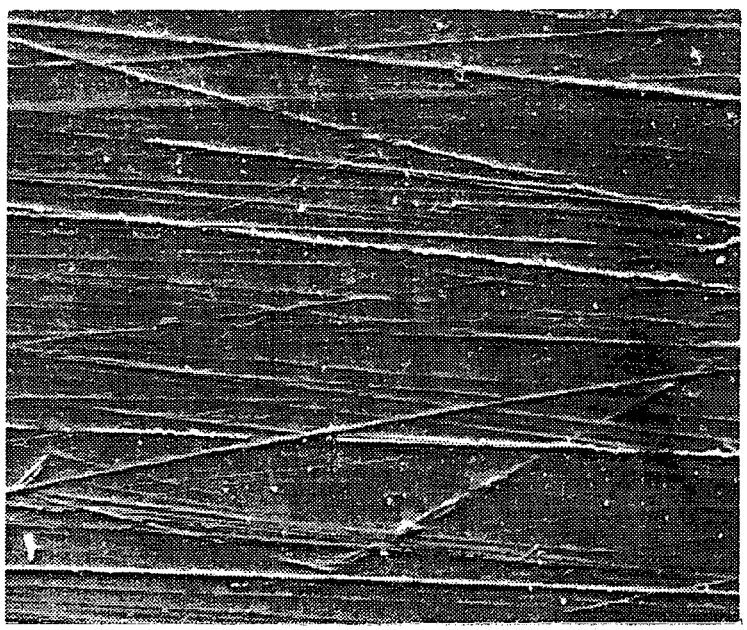
Figure 24:
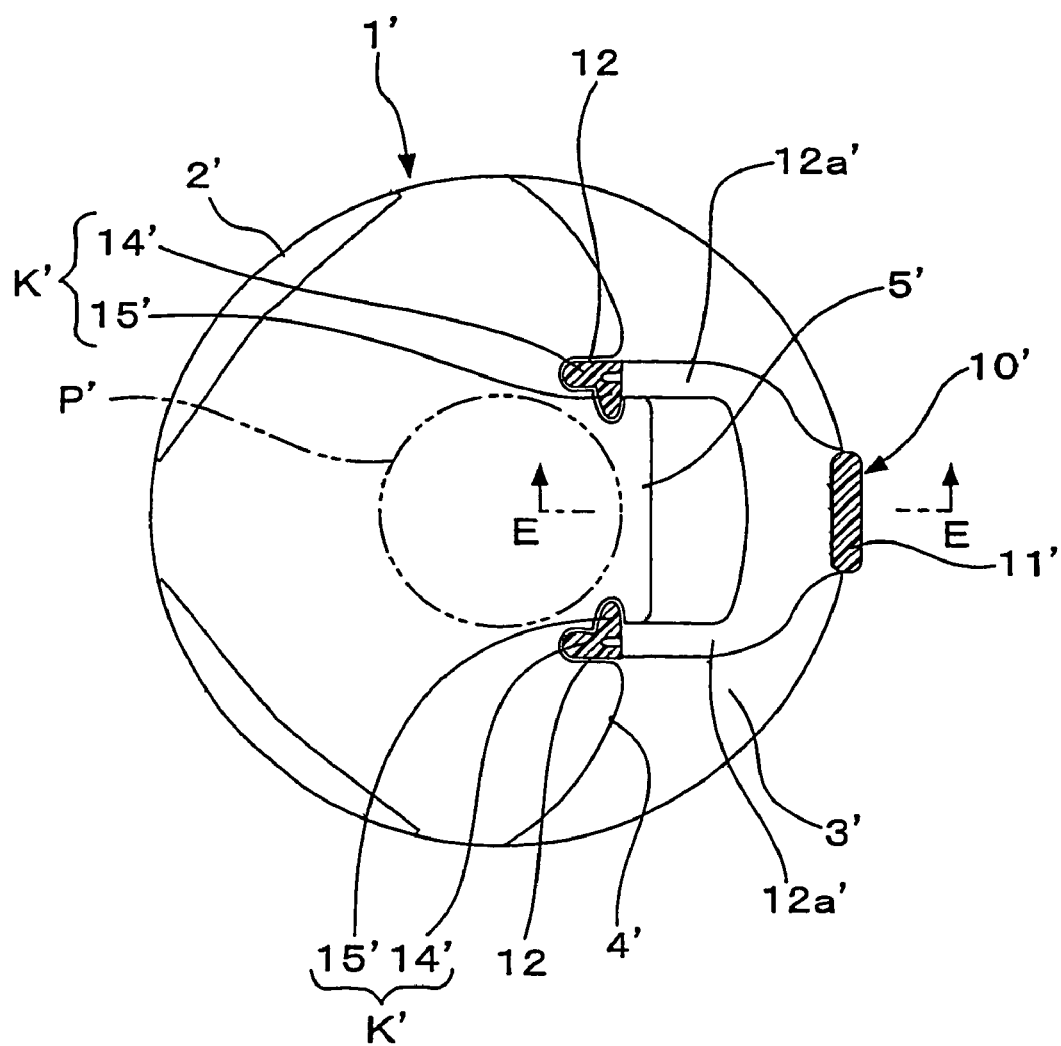
FIG. 24 is a cross-sectional plan view of the synthetic resin bottle with a handle in conventional art, taken from A—A in FIG. 1.
Figure 25:
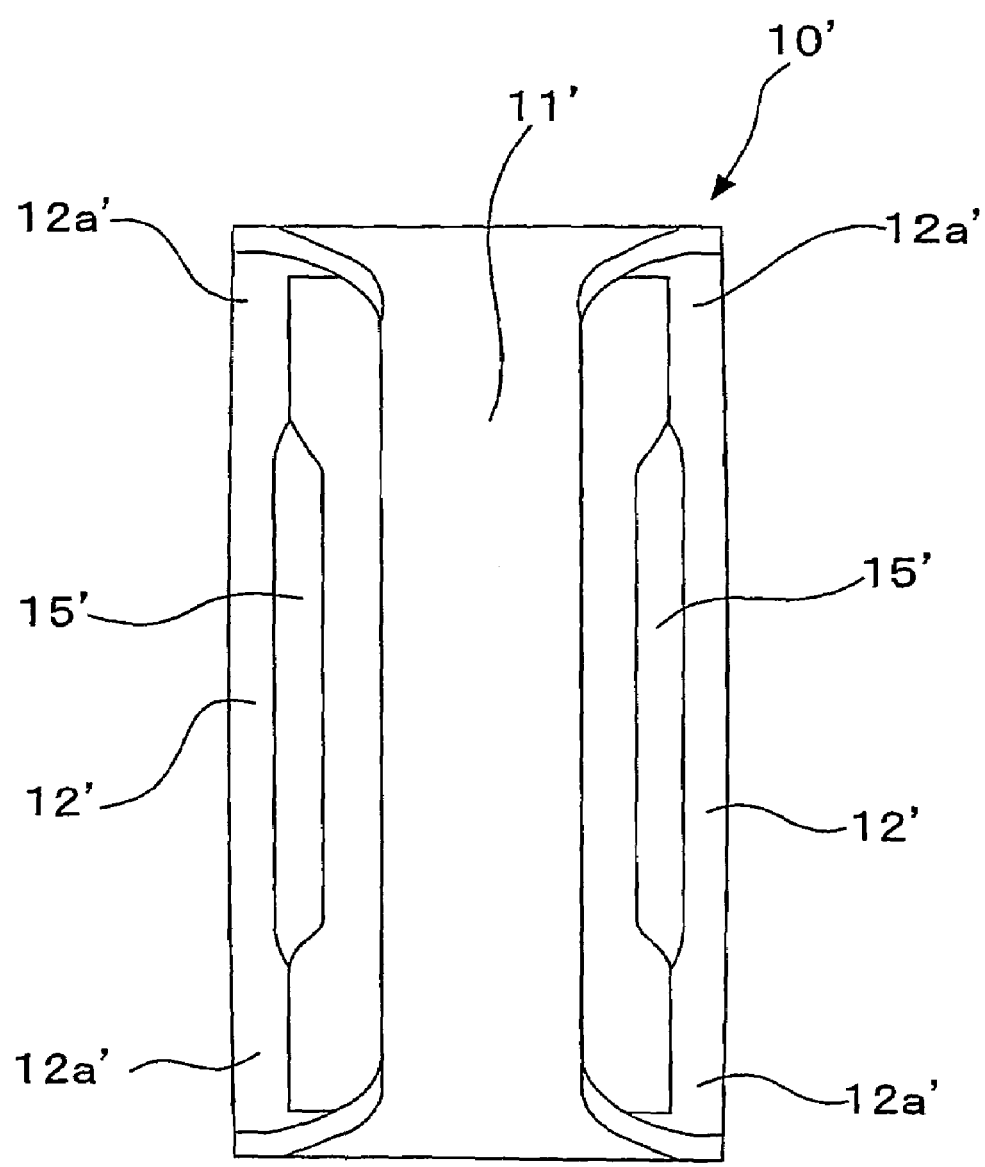
FIG. 25 is a rear view of the handle used in conventional art shown in FIG. 24.
Figure 26:
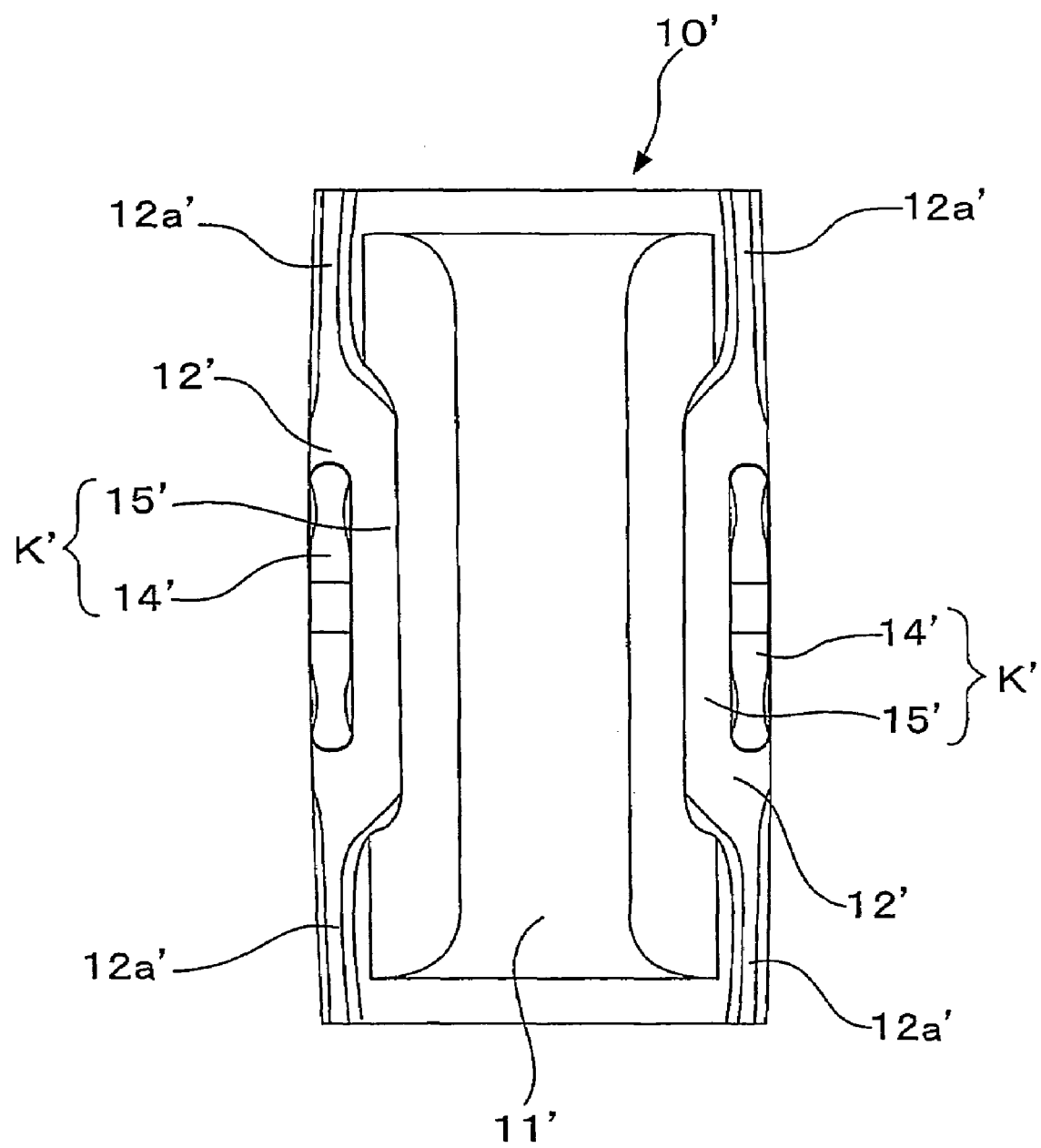
FIG. 26 is a front elevational view of the handle used in conventional art shown in FIG. 24.
Figure 27:
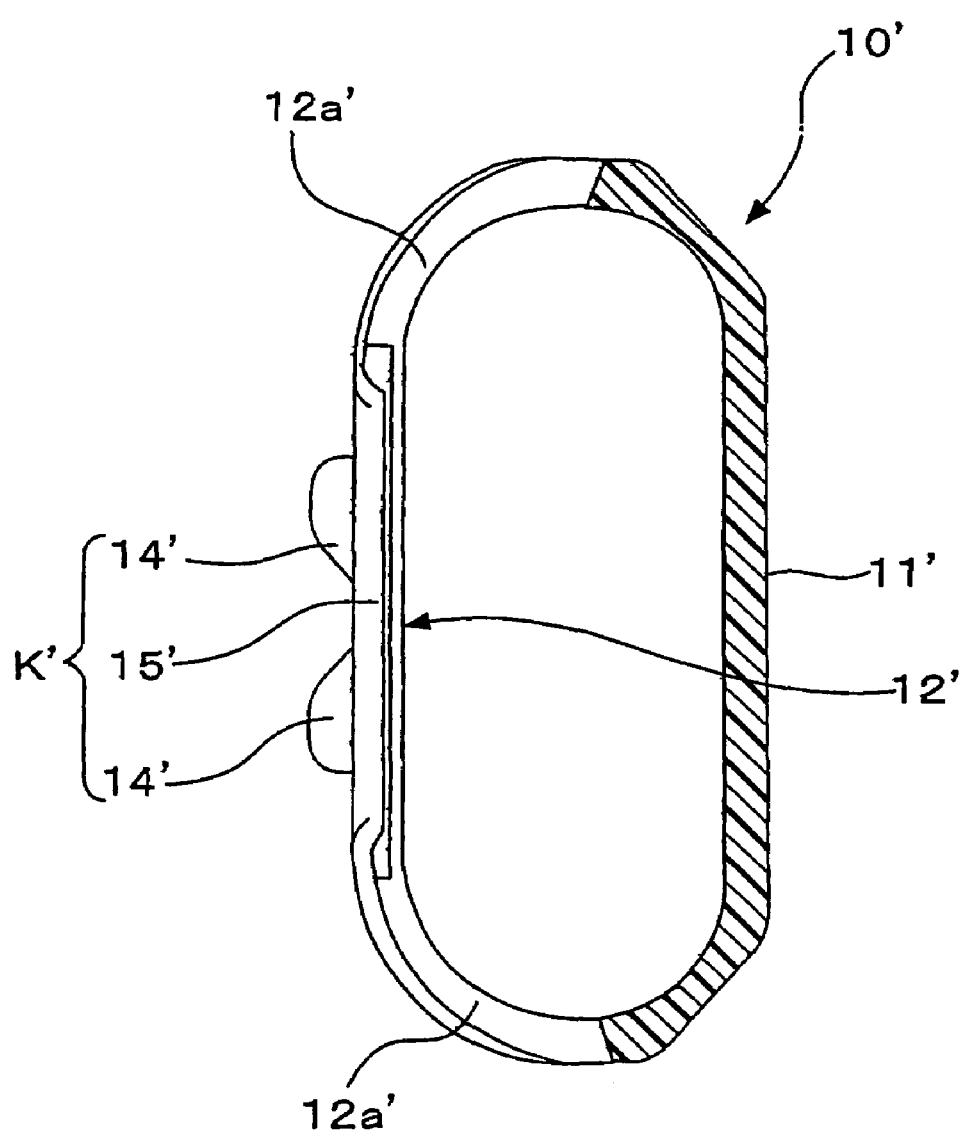
FIG. 27 is an entire side vertical view of the handle shown in FIG. 24, taken from line E—E in FIG. 24.

FIGS. 23(*a*) and 23(*b*) are referential photographs showing surface states of the connecting arms 12*a* before and after the above-described smoothing treatment.

The action and effect of this invention applied for a patent are not limited to the handle 10 in the above-described third embodiment, but are generally demonstrated in any handle of the type fitted and fixed by holding the vertical projecting wall on the recession bottom of the bottle tight with a pair of fitting beams provided with embedded projecting portions, which play the role of strong undercut fittings.

The handle having a shape of embedded projecting portions was described in conventional art and are as shown in FIGS. 24–27. In such a handle, similar action and effect were also demonstrated, and abrasions were eliminated, in the insert molding of a handle into larger-size bottles.

INDUSTRIAL APPLICABILITY

This invention having the above-described configuration has the following effects. In the invention, the up-and-down property of the surfaces of the handle inserts, which come in contact with the PET bottle, is adjusted in response to the softening and drawing state of the PET preform that is deformed and molded into the bottle. This adjustment causes the friction resistance to be reduced between the handle inserts and the blow-molded PET bottle. For instance, for the handle portions coming in contact with the PET bottle in the initial stage of drawing, a finely textured up-and-down pattern is formed. For the portions contacted in a relatively advanced stage of drawing, it is effective for the surfaces to have no up-and-down pattern but to have the so-called mirror-finish.

These finely textured up-and-down pattern and the mirror-finished surfaces can be easily formed through the tests and adjustments by the surface treatment inside the mold cavity used for the injection molding of the handle. Thus, the optimum surface properties can be obtained in response to the bottle sizes and the handle shapes. Therefore, this invention requires no separate process, such as thermal crystallization. Bottles capable of fully getting around the handle inserts and having high fitting strength but no abrasion can be provided at a low cost.

In the invention, a finely textured up-and-down pattern is closely formed on the surfaces of the handle inserts. This surface pattern lowers the friction resistance caused by the contact between the engaging ridges and the expanding bottle wall. The PET handle can be molded simply by an injection molding means, with no need of post-treatment, and can be used as the insert to the body of a biaxially drawn and blow-molded PET bottle. Thus, it is possible to avoid any inconvenience, which may be created under the circumstances where the operation for molding the bottle with a handle gets complicated by employing the PET handle.

In the invention, sliding action is derived from the finely textured up-and-down pattern on the surfaces of embedded projecting pieces, even if these pieces, a part of the handle inserts, are stuck out against the wall of the bottle during the process of drawing and deformation. Under this condition, the bottle is safely drawn and molded because the tensile force does not concentrate locally on the wall portions that come in contact with the embedded projecting pieces.

The engaging ridges, a part of the handle inserts, have good slidability because a finely textured up-and-down pattern is formed on the surfaces. Thus, the expanding and moving wall portion of the bottle smoothly gets around and climbs over the engaging ridges.

In the invention, not only a finely textured up-and-down pattern is formed on the front sides of the engaging ridges to give improved slide, but also many lateral, narrow grooves are disposed on the front sides to reduce the area of contact between the engaging ridges and the bottle. Since the contact friction resistance arising between these portions is lowered by these devices, it becomes possible for the expanding and moving portion of the bottle to get around and climb over the engaging ridges more smoothly than ever. Consequently, the main part of the bottle fitting portions, by which the handle is taken in, is molded under the condition that strong fitting can be obtained.

In the invention, many lateral, narrow grooves are notched on the front side of the engaging ridges, which are the portions of handle inserts, where large contact friction resistance is generated because the bottle wall portions have to get around and climb over the engaging ridges for smooth drawing and deformation. These narrow grooves reduce the area of contact between the engaging ridges and the expanding bottle wall, and lower the friction resistance upon contact with the expanding bottle. The PET handle can be molded simply by an injection molding means, with no need of post-treatment, and can be used as the insert to the body of a biaxially drawn and blow-molded PET bottle. Thus, it is possible to avoid any inconvenience, which may be created under the circumstances where the operation for molding the bottle with a handle gets complicated by employing the PET handle.

In the invention, the embedded projecting pieces are a part of handle inserts, and have smooth rounded surfaces, which prevent a large tensile force from being focused locally on the portion of the expanding bottle wall that comes in contact with the embedded projecting pieces. Thus, the drawing and molding of the bottle can be safely achieved.

In the invention, the embedded projecting pieces are stuck out against the wall of the bottle, but the forefront grooves notched in the stick-out end faces reduce the area of contact. Upon contact with the embedded projecting pieces, the bottle wall portion ceases to expand and deform. The reduced contact area ensures that the wall portion in contact with the handle continues to expand and deform.

In the invention, these abrasions can be prevented from occurring, by smoothing the surfaces of the connecting arms that come in contact with the bottle so that the slidability is improved between the connecting-arm surfaces and the softened PET preform P, which is right in the process of drawing and expansion.

In the invention, it is not always necessary to smooth all the surfaces of the connecting arms, which come in contact with the bottle. The occurrence of abrasions can be controlled by smoothing partially those specific portions that are selected suitably while checking over the places of abrasions.

In the invention, the preform completely accomplishes deformation along the peripheries of the embedded projecting portions at the initial stage of drawing and expansion. Consequently, it is possible for the PET bottle wall to get around the handle inserts quite smoothly. It is also possible for the bottle and the handle to obtain high fitting strength enough to be fully applicable to the bottles of larger sizes.

In the invention, larger-size bottles having no abrasion can be provided without changing the shape of conventional embedded projecting portions.

In the invention, the handle inserts, mainly comprising the embedded projecting portions but excluding the connecting arms, are the portions with which the blow-molded PET bottle comes in contact during the initial stage of drawing. A finely textured up-and-down pattern is closely formed in these insert portions. Since the PET bottle wall portion is allowed to get around the peripheries of the embedded projecting portions tightly, it is fully possible for the fitting strength to be increased to a satisfactory level.

The invention claimed is:

1. A synthetic resin bottle with a handle, comprising:
   a biaxially drawn and blow-molded bottle made of a polyethylene terephthalate resin, wherein the bottle has a recess that has been caved in at the rear of the bottle and a vertical projecting wall disposed in a central portion of a bottom of the recess; and
   a handle, an injection-molded product of a polyethylene terephthalate resin, which is fitted firmly to the bottle as an insert, wherein the handle comprises:
     a pair of fitting beams disposed in parallel to each other in a standing position;
     connecting arms that are bent and connected to upper and lower ends of the fitting beams;
     a grip plate integrally disposed at the rear of the handle to connect between the pair of fitting beams through an intermediary of the connecting arms; and
     embedded projecting portions, which are disposed on the pair of fitting beams and are used as firm undercut fittings to be fitted to the central portion of a bottom of the recess of the bottle, wherein the connecting arms, a part of the fitting beams, and the embedded projecting portions comprise handle inserts that are fitted to the central portion of a bottom of the recess on both sides of the vertical projecting wall of the bottle under the condition that many lateral, narrow grooves are disposed on front sides of the embedded projecting portions, away from the rear, facing the recess of the bottle.

2. The synthetic resin bottle with a handle, according to claim 1, wherein the connecting arms, the part of the fitting beams, and the embedded projecting portions comprise handle inserts that are fitted to the central portion of a bottom of the recess on both sides of the vertical projecting wall of the bottle under the condition that the connecting arms have portions with smooth, mirror-finishing like surfaces that come in contact with the bottle.

3. The synthetic resin bottle with a handle, according to claim 1, wherein the embedded projecting portions comprise embedded ridges which are located near a corner set by outer end face and opposed side of each fitting beam, with a cross-section of the embedded ridges having a roughly triangular shape formed by one side of a right angle going down from the opposed side in a roughly vertical direction and the other side of the right angle extending perpendicularly from the outer end face.

4. The synthetic resin bottle with a handle, according to claim 1, wherein each embedded projecting portion comprises embedded projecting pieces disposed on an outer end face of each fitting beam, and also comprises an engaging ridge projecting from an opposed surface of each fitting beam.

5. The synthetic resin bottle with a handle, according to claim 4, wherein the many lateral, narrow grooves are disposed on the front sides of the engaging ridge.

6. The synthetic resin bottle with a handle, according to claim 5, wherein a finely textured up-and-down pattern has been closely formed in advance on surfaces of insert portions of the handle, which come in contact with the bottle during the process of biaxial drawing and blow molding.

7. The synthetic resin bottle with a handle, according to claim 5, wherein the embedded projecting pieces have smooth rounded surfaces.

8. The synthetic resin bottle with a handle, according to claim 5, wherein forefront grooves of a vertical slit type are notched in stick-out end faces of the embedded projecting pieces.

9. The synthetic resin bottle with a handle, according to claim 3, wherein a finely textured up-and-down pattern has been closely formed in advance on surfaces of insert portions of the handle, which come in contact with the bottle during the process of biaxial drawing and blow molding.

10. The synthetic resin bottle with a handle, according to claim 2, wherein the embedded projecting portions comprise embedded ridges which are located near a corner set by outer end face and opposed side of each fitting beam, with a cross-section of the embedded ridges having a roughly triangular shape formed by one side of a right angle going down from the opposed side in a roughly vertical direction and the other side of the right angle extending perpendicularly from the outer end face.

11. The synthetic resin bottle with a handle, according to claim 2, wherein each embedded projecting portion comprises embedded projecting pieces disposed on an outer end face of each fitting beam, and also comprises an engaging ridge projecting from an opposed surface of each fitting beam.

12. A synthetic resin bottle with a handle, comprising:
    a biaxially drawn and blow-molded bottle made of a polyethylene terephthalate resin, wherein the bottle has a recess that has been caved in at the rear of the bottle and a vertical projecting wall disposed in a central portion of a bottom of the recess; and
    a handle, which comprises:
      a pair of fitting beams disposed in parallel to each other in a standing position;
      connecting arms that are bent and connected to upper and lower ends of the fitting beams;
      a grip plate integrally disposed to connect between the pair of fitting beams through an intermediary of the connecting arms; and
      embedded projecting portions, which are disposed on the pair of fitting beams and are used as firm undercut fittings to be fitted to the central portion of a bottom of the recess of the bottle, wherein the connecting arms, a part of the fitting beams, and the embedded projecting portions comprise handle inserts that are fitted to the central portion of a bottom of the recess on both sides of the vertical projecting wall of the bottle under the condition that the connecting arms have portions with smooth, mirror-like finishing surfaces that come in contact with the bottle.

13. The synthetic resin bottle with a handle, according to claim 12, wherein the smooth, mirror-like finishing surfaces of the connecting arms are limited to a portion thereof.

14. The synthetic resin bottle with a handle, according to claim 12, wherein each embedded projecting portion comprises embedded projecting pieces disposed on an outer end face of each fitting beam, and also comprises an engaging ridge projecting from an opposed surface of each fitting beam.

15. The synthetic resin bottle with a handle, according to claim 12, wherein the embedded projecting portions comprise embedded ridges which are located near a corner set by outer end face and opposed side of each fitting beam, with a cross-section of the embedded ridges having a roughly triangular shape formed by one side of a right angle going down from the opposed side in a roughly vertical direction and the other side of the right angle extending perpendicularly from the outer end face.

16. The synthetic resin bottle with a handle, according to claim 13, wherein the embedded projecting portions comprise embedded ridges which are located near a corner set by outer end face and opposed side of each fitting beam, with a cross-section of the embedded ridges having a roughly triangular shape formed by one side of a right angle going down from the opposed side in a roughly vertical direction and the other side of the right angle extending perpendicularly from the outer end face.

17. The synthetic resin bottle with a handle, according to claim 13, wherein each embedded projecting portion comprises embedded projecting pieces disposed on an outer end face of each fitting beam, and also comprises an engaging ridge projecting from an opposed surface of each fitting beam.

* * * * *

UNITED STATES PATENT AND TRADEMARK OFFICE
CERTIFICATE OF CORRECTION

| | | |
|---|---|---|
| PATENT NO. | : 7,108,146 B2 | Page 1 of 1 |
| APPLICATION NO. | : 10/508516 | |
| DATED | : September 19, 2006 | |
| INVENTOR(S) | : Junichi Itokawa, Yoshinori Matsuo and Takao Iizuka | |

It is certified that error appears in the above-identified patent and that said Letters Patent is hereby corrected as shown below:

Column 6, Line 17, the word "botfie" is misspelled and should read --bottle--.

Signed and Sealed this

Twenty-third Day of January, 2007

JON W. DUDAS
*Director of the United States Patent and Trademark Office*